United States Patent
Iwaki

(10) Patent No.: US 8,922,069 B2
(45) Date of Patent: Dec. 30, 2014

(54) LINEAR MOTOR ACTUATOR

(75) Inventor: Junichiro Iwaki, Tokyo (JP)

(73) Assignee: THK Co., Ltd., Tokyo (JP)

( * ) Notice: Subject to any disclaimer, the term of this patent is extended or adjusted under 35 U.S.C. 154(b) by 538 days.

(21) Appl. No.: 13/262,983

(22) PCT Filed: Apr. 5, 2010

(86) PCT No.: PCT/JP2010/056178
§ 371 (c)(1),
(2), (4) Date: Oct. 14, 2011

(87) PCT Pub. No.: WO2010/119788
PCT Pub. Date: Oct. 21, 2010

(65) Prior Publication Data
US 2012/0025635 A1     Feb. 2, 2012

(30) Foreign Application Priority Data

Apr. 15, 2009  (JP) ................................ 2009-098601
Dec. 25, 2009  (JP) ................................ 2009-293915

(51) Int. Cl.
*H02K 13/12*  (2006.01)
*H02K 33/16*  (2006.01)
*H01F 7/16*   (2006.01)

(52) U.S. Cl.
CPC .............. *H02K 33/16* (2013.01); *H01F 7/1615* (2013.01)
USPC ............................................. 310/14; 310/23

(58) Field of Classification Search
USPC .................. 310/13, 14, 17, 20, 23, 28, 31
See application file for complete search history.

(56) References Cited

U.S. PATENT DOCUMENTS 5,434,549 A     7/1995  Hirabayashi et al.
6,326,706 B1 * 12/2001  Zhang ........................ 310/12.31

FOREIGN PATENT DOCUMENTS

| JP | 6-315255 A | 11/1994 |
| JP | 7-009081 U | 2/1995 |
| JP | 11-168869 A | 6/1999 |
| JP | 2003-154314 A | 5/2003 |

OTHER PUBLICATIONS

International Search Report of PCT/JP2010/056178, mailing date Jul. 13, 2010.
Notification of Transmittal of Translation of the International Preliminary Report on Patentability (Form PCT/IB/338) of International Application No. PCT/JP2010/056178 mailed Nov. 24, 2011 with Forms PCT/IB/373 and PCT/ISA/237.

* cited by examiner

*Primary Examiner* — Dang Le
(74) *Attorney, Agent, or Firm* — Westerman, Hattori, Daniels & Adrian, LLP

(57) ABSTRACT

Provided is a linear motor actuator capable of oscillating a mover without using mechanical resilience of an elastic body. A first permanent magnet 3a and a second permanent magnet 3b magnetized in an axis direction are disposed in a mover 4 in the direction of the axis. A first coil 1a and a second coil 1b are disposed in a stator 2 so as to surround the first permanent magnet 3a and the second permanent magnet 3b, respectively. Alternating currents having the same phase are applied to the first coil 1a and the second coil 1b such that the phase of thrust generated in the first coil 1a and that of thrust generated in the second coil 1b are shifted from each other. At this moment, a center-to-center pitch LC1 between the center of the first coil 1a and that of the second coil 1b in the axis direction differs from a pole-to-pole pitch LM1 of the mover.

12 Claims, 23 Drawing Sheets

(a) Thrust to the left by $F_L > F_R$    (b) In balance    (c) Thrust to the right by $F_L < F_R$

LINEAR MOTOR ACTUATOR

TECHNICAL FIELD

The present invention relates to a linear actuator in which a mover moves in a single-axis direction relative to a stator. Particularly, the present invention relates to a stroke-type linear motor actuator in which a mover moves in one axis direction relative to a stator and then, it reverses the moving direction and moves in the opposite direction.

BACKGROUND ART

Conventionally, as such stroke-type linear motor actuator, there is known a voice coil motor having permanent magnets and coils (for example, see PL1). The operational principle of the voice coil motor utilizes Fleming's left-hand rule that thrust is generated when current is passed through a coil in a magnetic field created by a permanent magnet. When the alternating is passed through the coil, the coil travels in one-axis direction in the range of the magnetic field of the permanent magnet. As the voice coil motor has features of high-speed movement and lower cost, it is used in various applications such as a speaker, head driving of magnetic disk and spool driving of servo valve.

CITATION LIST

Patent Literature

PL1: Japanese Patent Application Laid-Open No. 2003-154314

SUMMARY OF INVENTION

Technical Problem

However, the voice coil motor has an essential problem that when a voice coil gets out of the range of magnetic field created by the permanent magnet, the voice coil cannot be controlled. When the voice coil moves relative to the permanent magnet at high speeds or when the voice coil has greater stroke, the voice coil sometimes gets out of the range of the magnetic field of the permanent magnet due to inertia. When more than half the voice coil gets out of the permanent magnet, the voice coil cannot be controlled even if current is passed through the voice coil to return to the original point.

In order to solve this problem, in the conventional voice coil motor, an elastic body such as spring or cone paper is mounted on the voice coil so that the voice coil can return into the range of the magnetic field of the permanent magnet with use of resilient of the elastic body.

However, in returning the voice coil with use of mechanical resilience of the elastic body, the oscillation frequency of the voice coil gets close to natural frequency of the elastic body, and when resonance occurs, oscillation of the voice coil becomes unstable. Therefore, the voice coil needs to be oscillated at a frequency at which resonance does not occur in the elastic body and there is a problem that the available frequency is restricted. Besides, when the stator is connected to the mover by the elastic body, the elastic body bends even by a force in a direction other than the oscillating direction and the structure becomes brittle inevitably.

The present invention was carried out to solve the above-mentioned problems of the conventional linear motor actuator and has an object to provide a linear motor actuator capable of moving a mover without use of mechanical resilience of an elastic body.

Solution to Problem

The following description is made about the present invention. A first aspect of the present invention is a linear motor actuator comprising: one of a mover and a stator having at least one permanent magnet magnetized with N and S poles in an axis direction; and an other of the mover and the stator having a first coil and a second coil that surround the one of the mover and the stator and are arranged in the axis direction, wherein alternating currents having same phases are passed through the first coil and the second coil and a center-to-center pitch that connects a center of the first coil to a center of the second coil in the axis direction is differentiated from a pole-to-pole pitch of magnetic poles of the one of the mover and the stator in such a manner that phase of thrust generated in the first coil and phase of thrust generated in the second coil are shifted from each other.

A second aspect of the present invention is a linear motor actuator comprising: one of a mover and a stator having at least one permanent magnet magnetized with N and S poles in an axis direction; and an other of the mover and the stator having a first coil and a second coil that surround the one of the mover and the stator and are arranged in the axis direction, wherein alternating currents having different phases are passed through the first coil and the second coil and a center-to-center pitch that connects a center of the first coil to a center of the second coil in the axis direction is conformed to a pole-to-pole pitch of magnetic poles of the one of the mover and the stator in such a manner that phase of thrust generated in the first coil and phase of thrust generated in the second coil are shifted from each other.

A third aspect of the present invention is a linear motor actuator comprising: one of a mover and a stator having at least one permanent magnet magnetized with N and S poles in an axis direction; and an other of the mover and the stator having a first coil and a second coil that surround the one of the mover and the stator and are arranged in the axis direction, wherein alternating currents having different phases are passed through the first coil and the second coil and a center-to-center pitch that connects a center of the first coil to a center of the second coil in the axis direction is differentiated from a pole-to-pole pitch of magnetic poles of the one of the mover and the stator in such a manner that phase of thrust generated in the first coil and phase of thrust generated in the second coil are shifted from each other.

A fourth aspect of the present invention is a linear motor actuator comprising: one of a mover and a stator having a first permanent magnet and a second permanent magnet that are magnetized with N and S poles in an axis direction and are arranged with a space created therebetween in such a manner that same poles face each other; and an other of the mover and the stator having a coil that surrounds the one of the mover and the stator, wherein an N pole-to-N pole pitch or an S pole-to-S pole pitch of outer magnetic poles of the first permanent magnet and the second permanent magnet is longer than a length of the coil in the axis direction, when an alternating current is passed through the coil, the mover moves relative to the stator, and when the mover moves up to an end of stroke, the first permanent magnet gets in the coil and when the mover moves to an opposite end of the stroke, the second permanent magnet gets into the coil.

Advantageous Effects of Invention

According to the first and third aspects of the present invention, as the thrust generated in the first coil is phase-shifted from the thrust generated in the second coil, for example, the thrust output from the first coil can be sine wave thrust and the thrust output from the second coil can be cosine wave thrust. As the force of pushing and pulling the mover can act on the first and second coils simultaneously, it is possible to early brake the mover that has moved close to an end of the stroke and entered the deceleration range and to oscillate the mover reliably. Besides, as the amounts of the first and second permanent magnets in the first and second coils vary while the mover is moving, the thrust generated in the first and second coils can vary more variously. As a result of this, it becomes possible to oscillate the mover well from a low frequency to a high frequency.

According to the second aspect of the present invention, as the thrust generated in the first coil is phase-shifted from the thrust generated in the second coil, for example, the thrust output from the first coil can be sine wave thrust and the thrust output from the second coil can be cosine wave thrust. As the force of pushing and pulling the mover can act on the first and second coils simultaneously, it is possible to early brake the mover that has moved close to an end of the stroke and entered the deceleration range and to oscillate the mover reliably.

According to the fourth aspect of the present invention, when the N pole-to-N pole pitch or the S pole-to-S pole pitch of outer magnetic poles of the first and second permanent magnets is longer than the length of the coil in the axis direction and the mover moves up to an end of the stroke, the first permanent magnet gets in the coil and when the mover moves up to the other end of the stroke, the second permanent magnet gets in the coil. With this structure, it is possible to increase resilience at ends of the stroke.

DESCRIPTION OF EMBODIMENTS

With reference to the attached drawings, embodiments of a linear motor actuator of the present invention will be described in detail below. The fundamental structure and operational principle of the linear motor are explained. The linear motor actuator includes a double coil type linear motor actuator that has first and second coils arranged in a stator and a single coil type linear motor actuator that has one coil. First description is made about the double coil type linear motor actuator.

Figure 1:
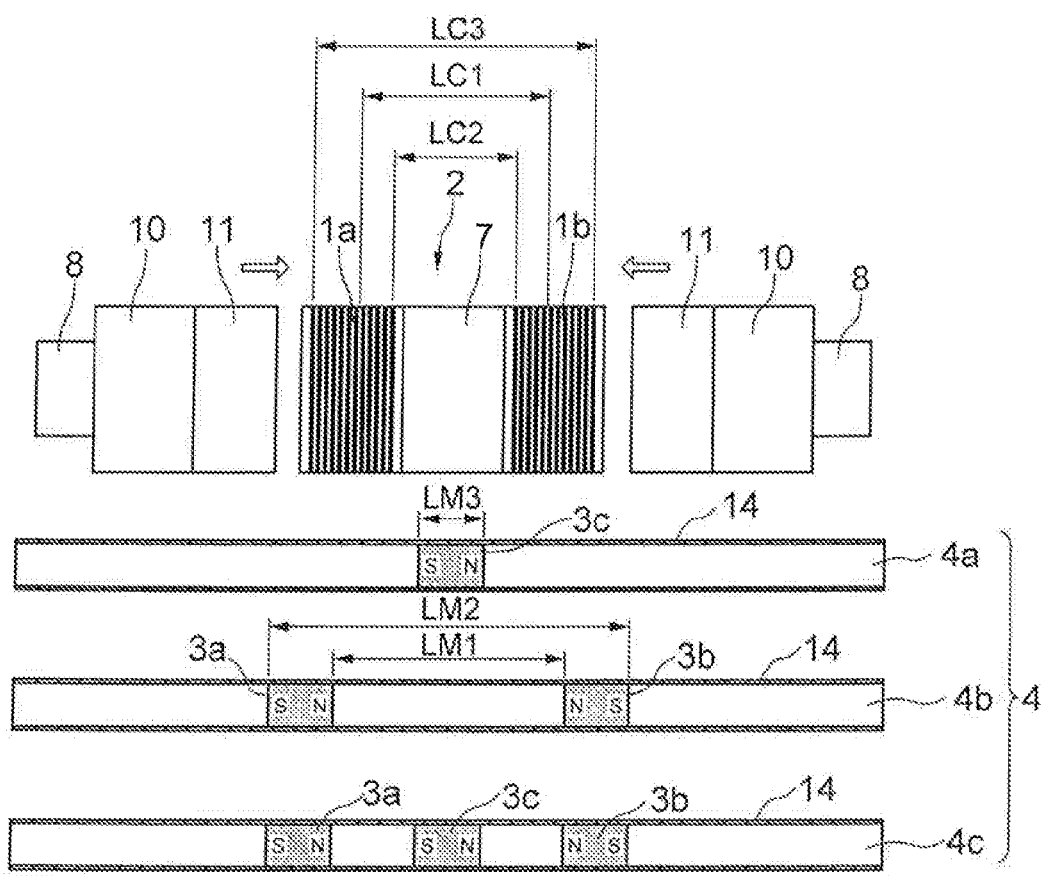
FIG. 1 is fundamental structural view of a linear motor actuator (double coil type) of the present invention.

As illustrated in FIG. 1, the double coil type linear motor actuator has a stator 2 in which two coils (first coil 1$a$ and second coil 1$b$) are arranged with their axes in agreement with each other. The lengths in the axis direction of the first coil 1$a$ and the second coil 1$b$ are equal to each other. The center-to-center pitch that connects the center of the first coil 1$a$ in the axis direction to the center of the second coil 1$b$ in the axis direction is indicated by LC1, the external dimensions of the first and second coils are denoted by LC3, and the internal dimensions of the first and second coils are denoted by LC2. Between the first and second coils 1$a$ and 1$b$, there is provided a spacer 7 to create a space between the coils. The first and second coils 1$a$ and 1$b$ form a coil unit and a linear bearing 8 is provided as, guiding means, outside the coil unit via a spacer 11 and a collar 10. The linear bearing 8 is a bush or spline that guides linear movement of a mover 4. The first coil 1$a$, the second coil 1$b$, the spacers 7 and 11 and the collar 10 are accommodated in a tubular yoke of the stator.

The shaft-shaped mover 4 passes through the first and second coils 1$a$ and 1$b$. The mover 4 is classified into three types 4$a$, 4$b$ and 4$c$ in accordance with the number of permanent magnets. That is, the type 4$a$ is such that a center permanent magnet 3$c$ is arranged in a pipe shaped rod, the type 4b is such that first and second permanent magnets 3a and 3b are arranged, and the type 4c is such that the center permanent magnet 3c and first and second permanent magnets 3a and 3b are arranged. The ratio of the number of coils to the number of permanent magnets of the types 4a to 4c are 2:1, 2:2 and 2:3, respectively. In any case, the mover 4 can vibrate.

Basically, the ratio of the number of coils to the number of permanent magnets stands at 2:2. The linear motor actuator according to the first embodiment of the present invention illustrated in FIG. 4 satisfies the number of coils:the number of permanent magnets=2:2 and has additional third and fourth permanent magnets 13a and 13b outside the permanent magnets.

First description is made about an example of the number of coils:the number of permanent magnets=2:2. As illustrated in FIG. 1, at both sides of the rod 14, bar shaped first and second permanent magnets 3a and 3b are arranged with a space created in the axis direction therebetween. These first and second permanent magnets 3a and 3b are in a one-to-one correspondence with the first and second coils 1a and 1b. Both ends of the first and second permanent magnets 3a and 3b in the axis direction are magnetized with N and S poles. The first and second permanent magnets 3a and 3b are arranged in the rod 14 in such a manner that the same poles face each other and in this example, N poles face each other. In this example, the inner magnetic poles (N poles) of the first and second permanent magnets 3a and 3b are closer to the center of the first and second coils 1a and 1b than the outer magnetic poles (S poles). And, the pole-to-pole pitch LM1 of the magnetic poles (N poles) nearer to the center of the first and second coils 1a and 1b is differentiated from the center-to-center pitch LC1 that connects the centers in the axis direction of the first and second coils 1a and 1b. A difference between the center-to-center pitch LC1 and the pole-to-pole pitch LM1 is set to be from one eight to three eights the length of each of the first and second coils 1a and 1b in the axis direction. This is for the purpose of shifting the phases of thrusts generated in the first and second coils 1a and 1b 90-degree from each other, which detail description is given later. The length of each of the permanent magnets 3a and 3b in the axis direction is shorter than the length of each of the coils 1a and 1b in the axis direction.

Here, when the outer magnetic poles of the first and second permanent magnets 3a and 3b are closer to the center of the first and second coils 1a and 1b than the inner magnetic poles of the first and second permanent magnets 3a and 3b (see FIG. 4), the pole-to-pole pitch LM2 of the outer magnetic poles of the first and second permanent magnets 3a and 3b is differentiated from the center-to-center pitch LC1 of the first and second coils 1a and 1b.

The positional relationship between the first and second coils 1a, 1b and the first and second permanent magnets 3a, 3b is such that when the mover 4b moves up to the right end in the axis direction, the first permanent magnet 3a is inserted in the first coil 1a and when the mover 4b moves up to the left end in the axis direction, the second permanent magnet 3b is inserted in the second coil 1b.

When the first and second coils 1a and 1b and the first and second permanent magnets 3a and 3b are arranged in this positional relationship and alternating current is passed through the first and second coils 1a and 1b in phase with each other, approximately 90-degree phase shifted thrusts are generated in the first and second coils 1a and 1b. That is, sine-wave thrust is generated in the first coil 1a and cosine-wave thrust is generated in the second coil 1b. As a force for pushing and pulling the mover 4b can be generated simultaneously in the first and second coils 1a and 1b, that is, there is timing of thrusts simultaneously acting on the first and second coils 1a and 1b axially in the opposite directions of the first and second coils 1a and 1b acting on the first and second coils 1a and 1b (thrusts that face each other and separate from each other), it is possible to brake the mover 4b early that has moved near an end of the stroke and entered a deceleration range. Besides, as the center-to-center pitch LC1 that connects centers in the axis direction of the first and second coils 1a and 1b to each other is differentiated from the pole-to-pole pitch LM1 inside the first and second permanent magnets 3a and 3b, the amount of the first and second permanent magnets 3a and 3b located in the first and second coils 1a and 1b varies while the mover 4b moves. Therefore, it is possible to change the thrust generated on the first and second coils 1a and 1b further variously.

Even when the mover 4b moves close to the end (for example, left end in FIG. 1) and the N pole of the first permanent magnet 3a gets out of the first coil 1a, the length of the second permanent magnet 3b in the second coil 1b can be increased. Accordingly, the resilience at the end of the stroke can be ensured. Consequently, the mover 4b can be vibrated without use of mechanical resilience of an elastic body. As no mechanical elastic body having oscillation frequency is used, it is possible to oscillate the mover well from low frequency to high frequency.

Next description is made about an example where the ratio of the number of coils to the number of permanent magnets is 2:1 and one center permanent magnet 3c is arranged in the mover 4a. At the center of cylindrical rod 14, the single columnar center permanent magnet 3c is arranged. The center permanent magnet 3c is magnetized in the axis direction or with N and S poles at both ends. The length LM3 of the center permanent magnet 3c in the axis direction has only to be shorter than the outer dimensions LC3 of the first and second coils 1a and 1b and here, it is set to be shorter than the inner dimensions LC2. Therefore, while the center permanent magnet 3c is arranged at the center between the first and second coils 1a and 1b, the first coil 1a and the second coil 1b are arranged outside the center permanent magnet 3c in the axis direction. The length of the center permanent magnet 3c in the axis direction is set to be shorter than the length of each coil 1a, 1b in the axis direction. As to the positional relationship between the first and second coils 1a, 1b and the center permanent magnet 3c, when the mover 4a moves up to an end in the axis direction, one magnetic pole of the center permanent magnet 3c enters one of the first and second coils 1a and 1b and when the mover 4a moves up to the opposite end in the axis direction, the opposite magnetic pole of the center permanent magnet 3c enters the other of the first and second coils 1a and 1b.

When the first and second coils 1a and 1b and the center permanent magnet 3c are arranged in this positional relationship and alternating current is passed through the first and second coils 1a and 1b in phase, the mover 4a oscillates.

In the mover 4c in which the ratio of the number of coils to the number of permanent magnets is 2:3 and three permanent magnets are arranged in the mover 4c, the column-shaped first and second permanent magnets 3a and 3b are arranged at both sides of the rod 14 and the column-shaped center permanent magnet 3c is arranged at the center of the rod 14. The position, length and magnetic poles of the first and second permanent magnets are the same as those of the mover 4b in which the above-mentioned first and second permanent magnets 3a and 3b are arranged. The position, length and magnetic poles of the center permanent magnet 3c are the same as those of the mover 4a in which the above-mentioned single center permanent magnet 3c is arranged.

Figure 2:
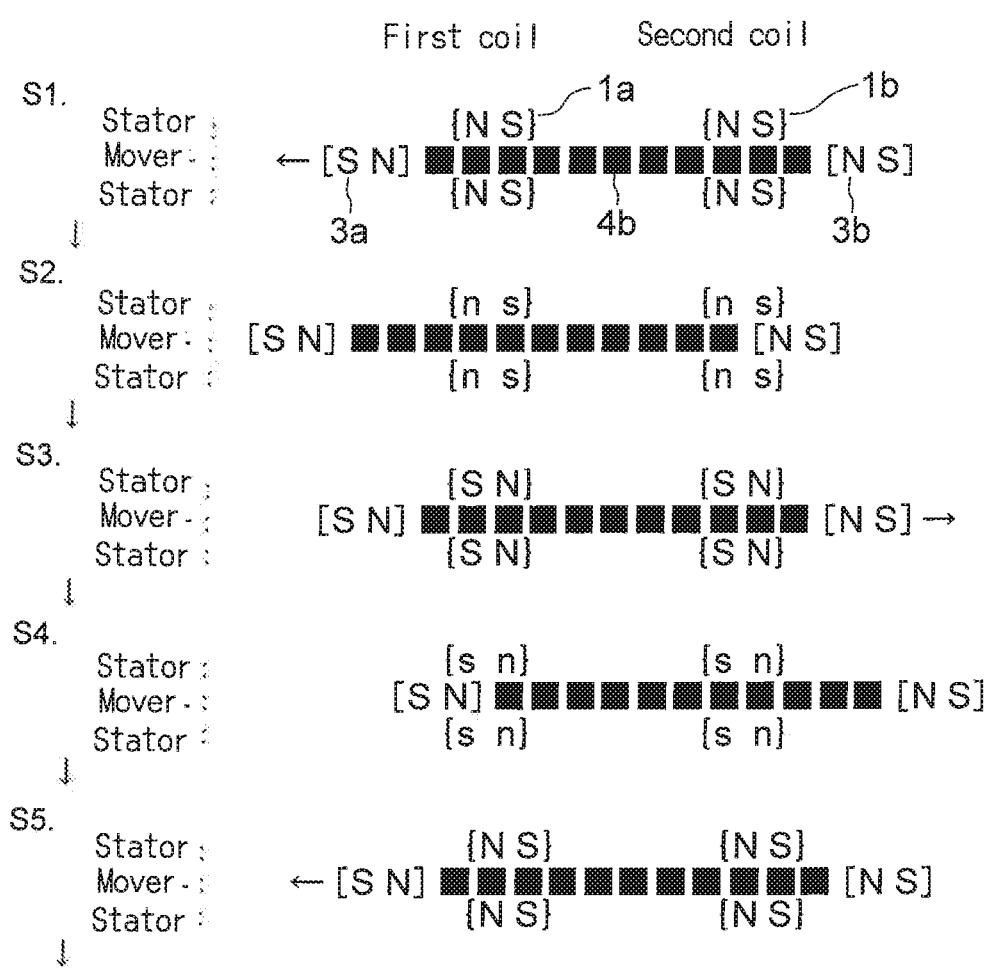
FIG. 2 is a fundamental view of an operation of a mover (the number of coils:the number of permanent magnets=2:2).

FIG. 2 illustrates operational principle of the mover 4b when the ratio of the number of coils to the number of permanent magnets is 2:2. In this example, in-phase alternating currents flow in the first and second coils 1a and 1b and at both ends of the first and second coils 1a and 1b, N, S, N, S poles are created in this order from the left. The first and second permanent magnets 3a and 3b are provided in such a manner that the same poles face each other, for example, S, N, N, S poles are formed in this order from the left. At both ends of the first coil 1a, magnetic poles are created in order of NS, ns, SN, sn and NS. At both ends of the second coil 1b, the magnetic poles are created in order of NS, ns, SN, sn and NS. Here, the magnetic field of the magnetic poles in capital letters is stronger than the magnetic field of the magnetic poles in lowercase letters.

When the center in the axis direction of the first and second coils 1a and 1b is in close agreement with the center in the axis direction of the first and second permanent magnets 3a and 3b (the mover 4b is arranged in the center of the stroke) and in-phase alternating current is passed through the first and second coils 1a and 1b, the first permanent magnet 3a arranged at the left side of the first coil 1a repels the first coil 1a. Then, the second permanent magnet 3b arranged at the right side of the second coil 1b is attracted by the second coil 1b. Therefore, the mover 4b moves to the left in the figure (S1). When the second permanent magnet 3b is in the second coil 1b (S2), the current flow in the second coil 1b is revered. Then, larger repelling force from the second coil 1b acts on the second permanent magnet 3b and the mover 4b moves to the right in the figure (S3). When the mover 4b goes beyond the center of the stroke, the thrust in the right direction in the figure acts on the mover 4b. When the first permanent magnet 3a is in the first coil 1a (S4) and the current flow in the first coil 1a is revered, larger repelling force from the first coil 1a acts on the first permanent magnet 3a and the mover 4b moves to the left in the figure (S5). Then, the mover 4b returns to the center of the stroke.

When the first permanent magnet 3a and the first coil 1a form a first motor and the second permanent magnet 3b and the second coil 1b form a second motor, the first motor and the second motor face each other and push each other in operation and the first and second motors are self-contained. Therefore, the directions of N and S of the first coil 1a and the first permanent magnet 3a may be opposite and also the directions of N and S of the second coil 1b and the second permanent magnet 3b may be opposite.

Figure 3:
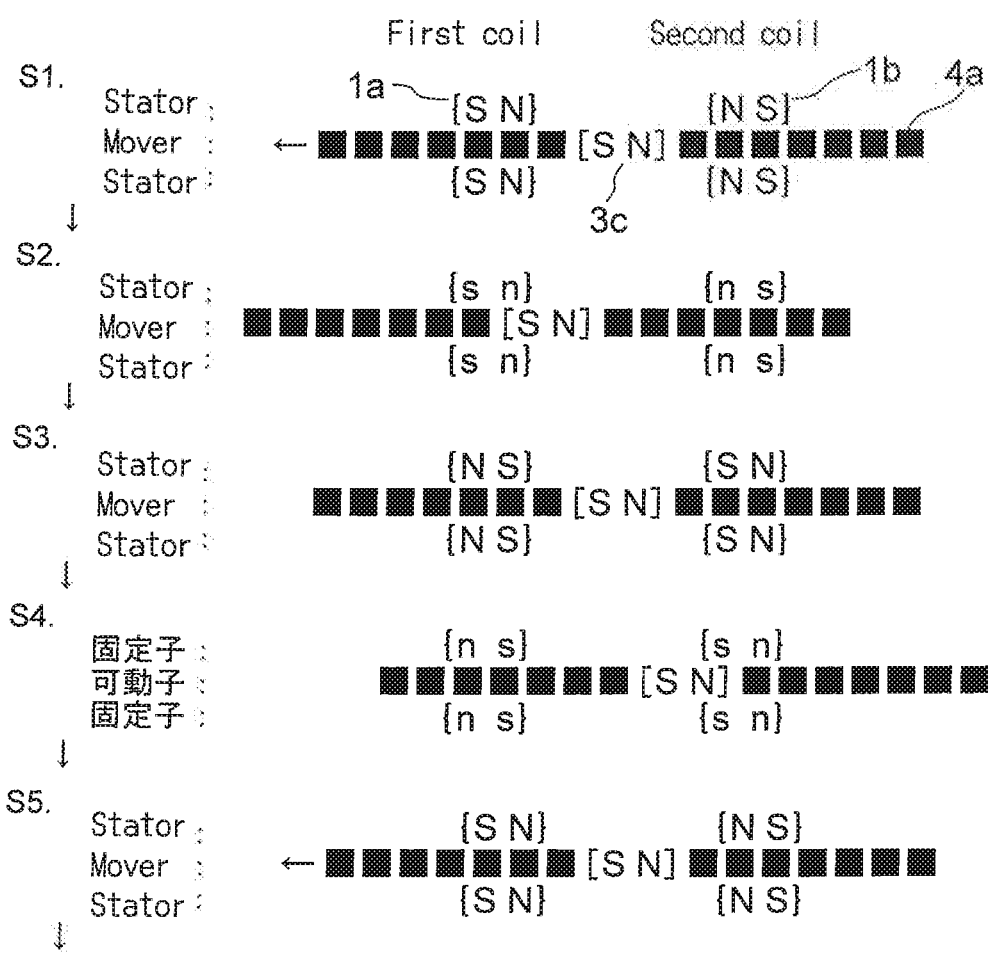
FIG. 3 is a fundamental view of an operation of a mover (the number of coils:the number of permanent magnets=2:1).

FIG. 3 illustrates the operational principle of the mover 4a when the ratio of the number of coils to the number of permanent magnets is 2:1. The same-phase alternating current passes through the first and second coils 1a and 1b. At both ends of the first and second coils 1a and 1b, the magnetic poles are formed in such a manner that the same poles face each other. That is, in the first and second coils 1a and 1b, the N and S poles are formed symmetrically about the center of the first and second coils 1a and 1b in the axis direction. At both ends of the first coil 1a, the magnetic poles are formed in order of SN, sn, NS, ns and SN. At both ends of the second coil 1b, the magnetic poles are formed in order of NS, ns, SN, sn and NS. Here, the magnetic field of the magnetic poles in capital letters is stronger than the magnetic field of the magnetic poles in lowercase letters.

The center permanent magnet 3c is arranged in the magnetic field generated in the first and second coils 1a and 1b. When the center permanent magnet 3c of the mover 4a is positioned at the center of the first and second coils 1a and 1b in the axis direction and the same-phase alternating current passes through the first and second coils 1a and 1b, the center permanent magnet 3c is attracted by the first coil 3a, repels the second coil 1b and moves to the left in the figure (S1). The permanent magnet 3c that has moves to the left is further attracted by the first coil 1a and enter the first coil 1a (S2). When the center permanent magnet 3c is in the first coil 1a and the current flow in the first coil 1a is reversed, larger repelling force acts on the center permanent magnet 3c by the first coil 1a and the mover 4a moves to the right in the figure (S3). After moving up to the center of the stroke, is enters the second coil 1b by attraction of the second coil 1b (S4). When the current flow in the second coil 1b is reversed, larger repelling force acts on the permanent magnet by the second coil 1b and the permanent magnet 3c moves to the left in the figure (S5). These are repeated thereby to oscillate the mover 4a.

Figure 4:
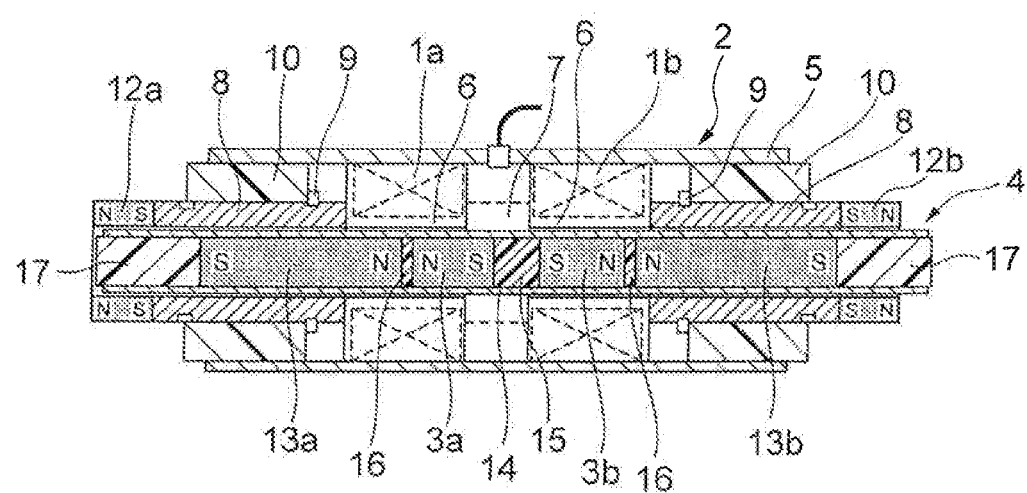
FIG. 4 is a cross sectional view of a linear motor actuator (double coil type) according to a first embodiment of the present invention.

FIG. 4 illustrates a double coil type linear motor actuator according to the first embodiment of the present invention. The linear motor actuator has a stator 2 having first and second coils 1a and 1b and a mover 4 having first and second permanent magnets 3a and 3b. The ratio of the number of coils to the number of permanent magnets is 2:2.

In a cylindrical case 5 that forms an outer shape of the stator 2, two ring-shaped coils 1a and 1b are accommodated with their axis lines in agreement with each other. The case 5 may be of magnetic material or nonmagnetic material. When the case 5 is made of magnetic material, the magnetic flux generated from the first and second permanent magnets 3a and 3b are guided to the case 5, the magnetic flux is easily orthogonal to the first and second coils 1a and 1b and larger thrust can act on the mover 4. Each of the coils 1a and 1b is wound on a tubular bobbin 6. Between the bobbins 6, a nonmagnetic spacer 7 is provided to create a space between the first and second coils 1a and 1b. The coil lengths in the axis direction of the first and second coils 1a and 1b are substantially equal to each other.

The first and second coils 1a and 1b form a coil unit. Axially outside the coil unit, two linear bushes 8 are provided as guiding means for guiding linear movement of the mover 4. Each linear bush 8 is fixed to the collar 10 by a stop ring 9. The collar 10 is fixed to both ends of the case 5 in the axis direction. Axially outside the paired linear bushes 8, a pair of ring-shaped repelling magnets 12a, 12b is provided as returning permanent magnets. These repelling magnets 12a and 12b repel permanent magnets outside the mover 4 which are described later. Therefore, when an external force is applied, the mover 4 is kept in balance at the center original point of the stroke, that is, at the axially center position of the first and second coils 1a and 1b. Besides, as the repelling magnets 12a and 12b are provided, the mover 4 is prevented from falling down from the stator 2 when power is off. This is effective particularly when the mover 4 is installed vertically. In order to stop the mover 4 at a predetermined position shifted from the original point, the right and left repelling magnets 12a and 12b need to be differentiated in the magnitude of the magnetic force.

Figure 5:
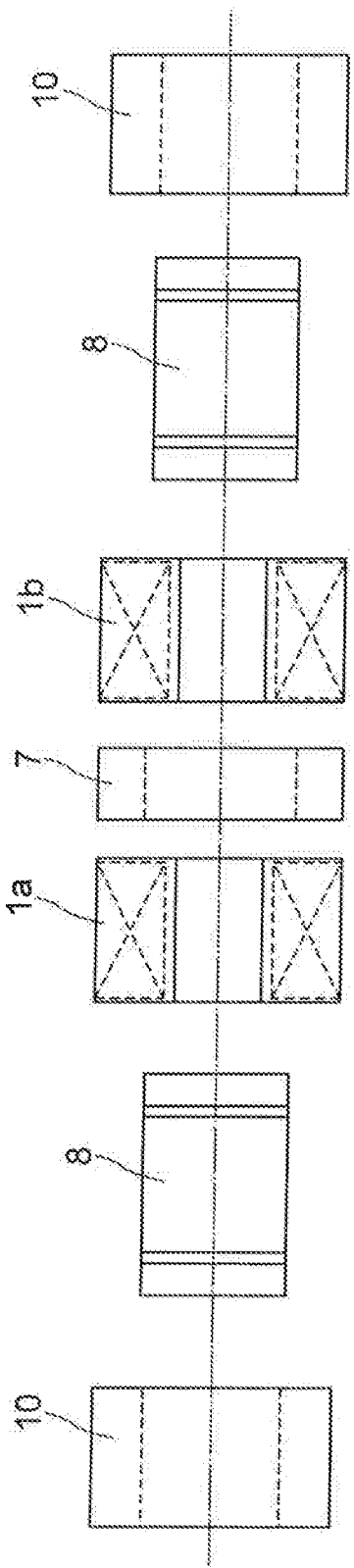
FIG. 5 is an exploded view of a stator.

FIG. 5 is an exploded view of the collar 10, the linear bushes 8, the coils 1a, 1b and the spacer 7 accommodated in the case 5. The paired coils 1a and 1b and the paired linear bushes 8 are arranged symmetrically about the center of the spacer 7.

As illustrated in FIG. 4, the mover 4 has a pipe shaped rod 14 and the two permanent magnets 3a and 3b accommodated in the rod 14. The rod 14 is made of nonmagnetic material such as synthetic resin. The rod 14 is supported by the linear bushes 8 and a ring-shaped and slightly magnetic space is created between the rod 14 and the bobbin 6.

In the rode 14, the first and second permanent magnets 3a and 3b are arranged via the spacer 15. The magnetic poles of the first and second permanent magnets 3a and 3b (N and S poles) are aligned along the axis line. The first and second permanent magnets 3a and 3b are arranged in such a manner that the same poles (S poles in this embodiment) face each other. The lengths of the first and second permanent magnets 3a and 3b in the axis direction are substantially equal to each other. The length of each coil 1a, 1b in the axis direction is longer than the length of each permanent magnet 3a, 3b in the axis direction. The pole-to-pole pitch of the outer magnetic poles of the first and second permanent magnets 3a and 3b (N pole-to-N pole pitch) is preferably longer than the coil length of center-to-center pitch of the first and second coils by ⅛ to ⅜ times the coil length.

Figure 6:
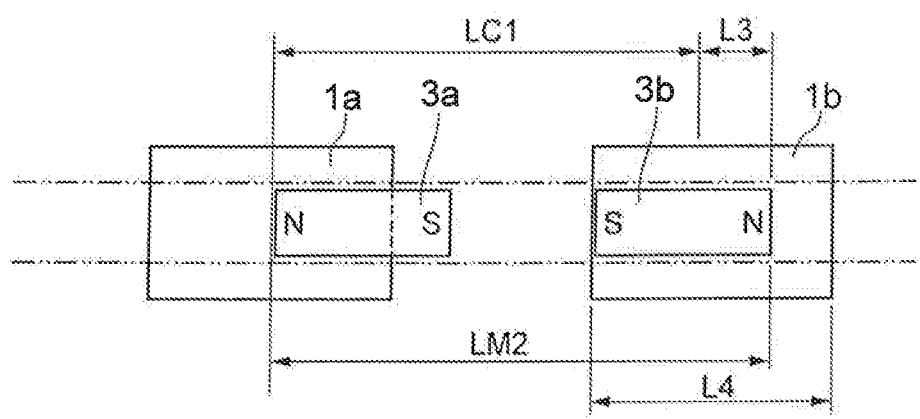
FIG. 6 is a schematic diagram illustrating relationship between a center-to-center pitch and a pole-to-pole pitch of a permanent magnet.

As illustrated in FIG. 6, in this embodiment, a shift amount L3 of the distance LC1 between the centers of the first and second coils 1a, 1b from the distance LM2 between the outer magnetic poles of the two permanent magnets 3a, 3b is set to be ¼ the coil length L4 (¼ wavelength). For example, when the coil length is 10 mm, the length of each permanent magnet is 6 mm and the length of the spacer between the coils is 6 mm, the distance LC1 connecting the centers of the first and second coils 1a and 1b to each other is 16 mm (LC1=5+6+5=16). The distance LM2 between the outer magnetic poles of the two permanent magnets 3a and 3b needs to be longer by ¼ the coil length, the distance LM2 is 18.5 (16+10/4). The shift amount between LC1 and LM2 is not limited to ¼ the coil length and may fall within a range of ⅛ to ⅜ the coil length. When the mover 4 moves to an end of the stroke, the magnetic pole (N pole in this example) of the first permanent magnet 3a comes close to the center of the first coil 1a in the axis direction and the magnetic pole (N pole in this example) of the second permanent magnet 3b goes away from the center of the second coil 1b in the axis direction. When the mover 4 moves to the other end of the stroke, the magnetic pole (N pole in this example) of the second permanent magnet 3b comes close to the center of the second coil 1b in the axis direction and the magnetic pole (N pole in this example) of the first permanent magnets 3a goes away from the center of the first coil 1a in the axis direction.

As illustrated in FIG. 4, a spacer 15 is provided between the permanent magnets 3a and 3b that repel one another. As the spacer 15 is provided therebetween, it is possible to create a magnetic field lines that extends radially from the spacer 15 and act on the first and second coils 1a and 1b. The spacer 15 may be made of either nonmagnetic material such as resin or magnetic material such as iron. If the spacer 15 is made of magnetic material, magnetoresistance is reduced and it becomes possible to create more magnetic field lines.

Outside the two permanent magnets 3a and 3b, third and fourth permanent magnets 13a and 13b are arranged. The third and fourth permanent magnets 13a and 13b are arranged with the first and second permanent magnets 3a and 3b in such a manner that the same poles face each other. In this embodiment, the N poles of the first and second permanent magnets 3a and 3b face the N poles of the third and fourth permanent magnets. Between the first and second permanent magnets 3a, 3b and the third and fourth permanent magnets 13a, 13b, spacers 16 are provided so as to create repelling magnetic field lines easily. As the third and fourth permanent magnets 13a and 13b are provided, it is possible to strengthen the magnetic field generated by the outer magnetic pole (N pole) of the first and second permanent magnets 3a and 3b and to oscillate the mover 4 vigorously.

The lengths in the axis direction of the third and fourth permanent magnets 13a and 13b are longer than the lengths in the axis direction of the permanent magnets 3a and 3b. The longer the lengths in the single-axis direction of the outer permanent magnets 13a and 13b, the stronger the magnetic field generated in the outer magnetic poles (N poles) of the two permanent magnets 3a and 3b, and it becomes possible to oscillate the mover 4 vigorously.

Both ends of the rod 14 of the mover 4 are blocked with two cover members 17. The two cover members 17 are fixed to the both ends of the rod 14 and sandwich the permanent magnets 3a, 3b and outer permanent magnets 13a, 13b.

Figure 7:
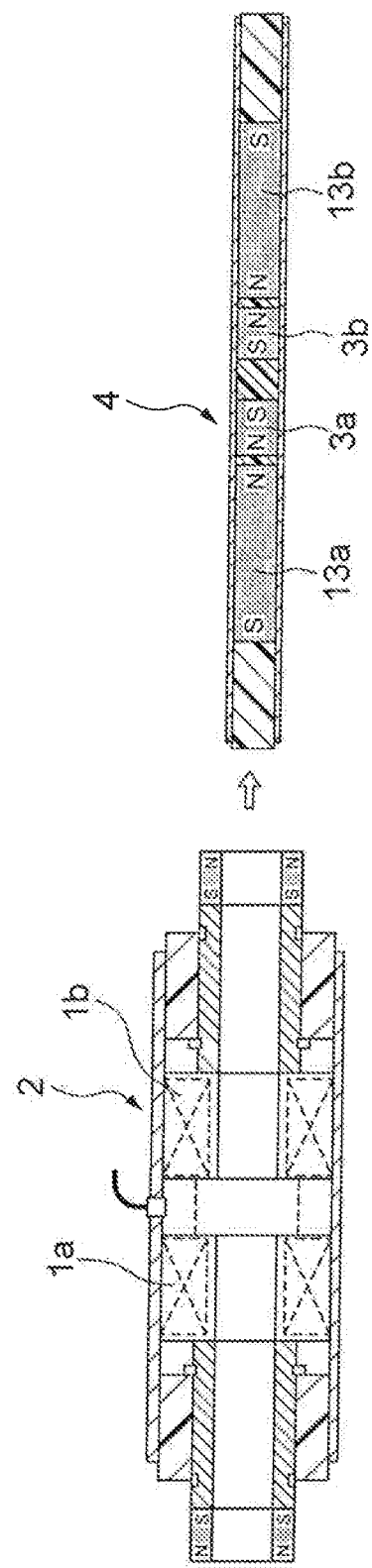
FIG. 7 is a cross sectional view of the stator from which the mover is pulled out.

FIG. 7 illustrates the mover 4 pulled out of the stator 2. The mover 4 and the stator 2 are not connected to each other by an elastic body such as blade spring, and linear movement in the single-axis direction of the mover 4 is guided only by the linear bush 8 of the stator 2. If the mover 4 is pulled out in the single-axis direction, it becomes possible to separate the mover 4 from the stator 2 completely.

Figure 8:
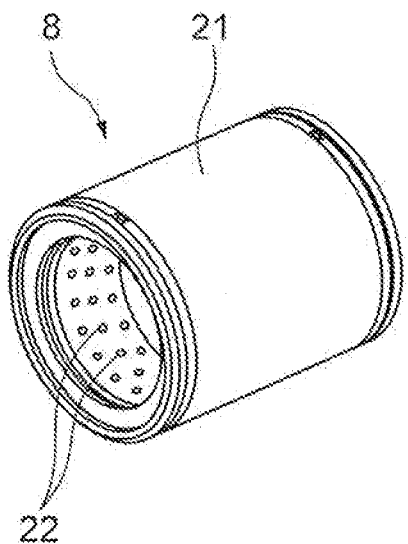
FIG. 8 is a perspective view of a linear bush.
Figure 9:
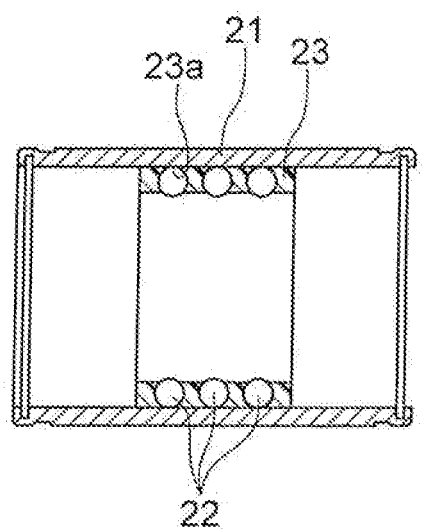
FIG. 9 is a cross sectional view of the linear bush.

FIG. 8 is a perspective view of a linear bush 8 that guides the mover 4 and FIG. 9 is a cross sectional view of the linear bush 8. The linear bush 8 has a metal outer casing 21, a plurality of balls 22 that roll on the inner peripheral surface of the outer casing 21 and a holder 23 that holds the balls 22 with a space left therebetween. As the mover 4 moves relative to the stator 2, the plural balls 22 roll between the inner peripheral surface of the outer casing 21 and the outer peripheral surface of the mover 4. The holder 23 is formed into a cylinder and has a plurality of holes 23a that pass from the inner periphery to the outer periphery. The balls 22 are rotatably held in these plural holes 23a. The length in the axis direction of the holder 23 is shorter than the length in the axis direction of the outer casing 21. The holder 23 travels in the outer casing 21 finitely together with the balls 22.

Use of the linear bush 8 enables smooth linear movement of the mover 4 in the single-axis direction relative to the stator 2 and it becomes possible to realize a structure that is highly rigid in directions other then the single-axis direction. As there is no need to connect the mover 4 to the stator 2 via an elastic body such as a blade spring like the conventional voice coil motor, lineup and maintenance can be facilitated.

Besides, as the holder 23 is provided to keep a fixed space between the balls 22, it is possible to solve the problem that the balls 22 attract each other by the magnetic force of the permanent magnets 3a and 3b and the coils 1a and 1b. The balls 22 may be of magnetic body or nonmagnetic body. If the balls 22 are made of magnetic material and the holder 23 is not provided in the linear bush 8 used here, the balls 22 attract each other by the magnetic force and there occur problems of shortened useful life, reduced accuracy and heat generation. If the balls 22 are made of nonmagnetic material such as resin or ceramics, it becomes possible to prevent the balls 22 from attracting each other.

If the linear bush is replaced with a ball spline, it becomes possible to stop rotation of the mover 4. Balls of the ball spline may be made of magnetic material or nonmagnetic material.

Figure 10:
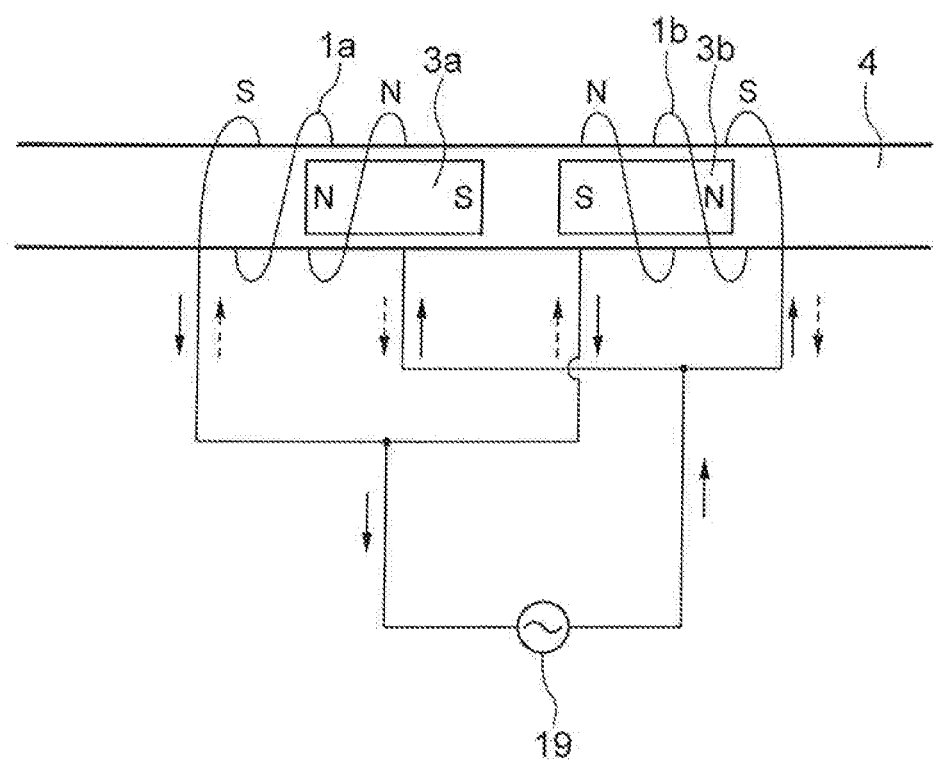
FIG. 10 is a connection diagram of first and second coils (in parallel).
Figure 11:
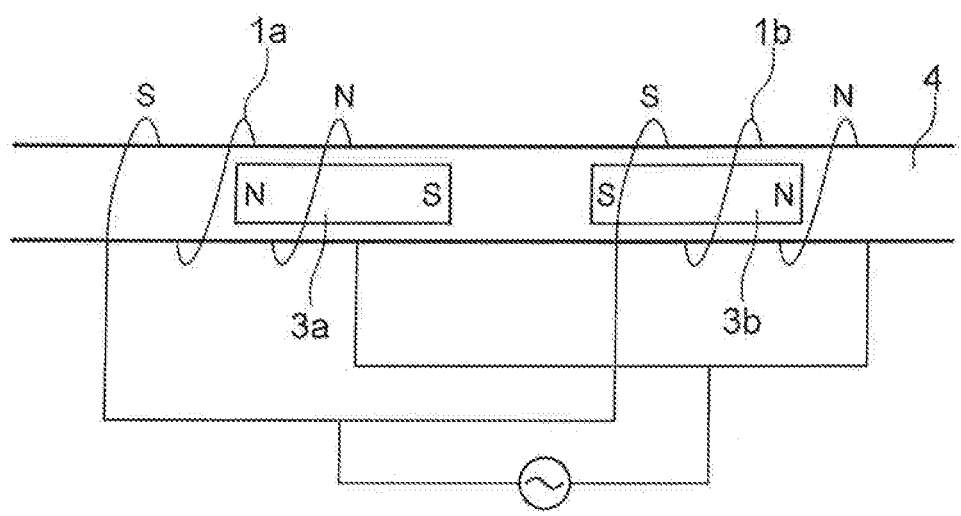
FIG. 11 illustrates another example of the connection diagram of the first and second coils.
Figure 12:
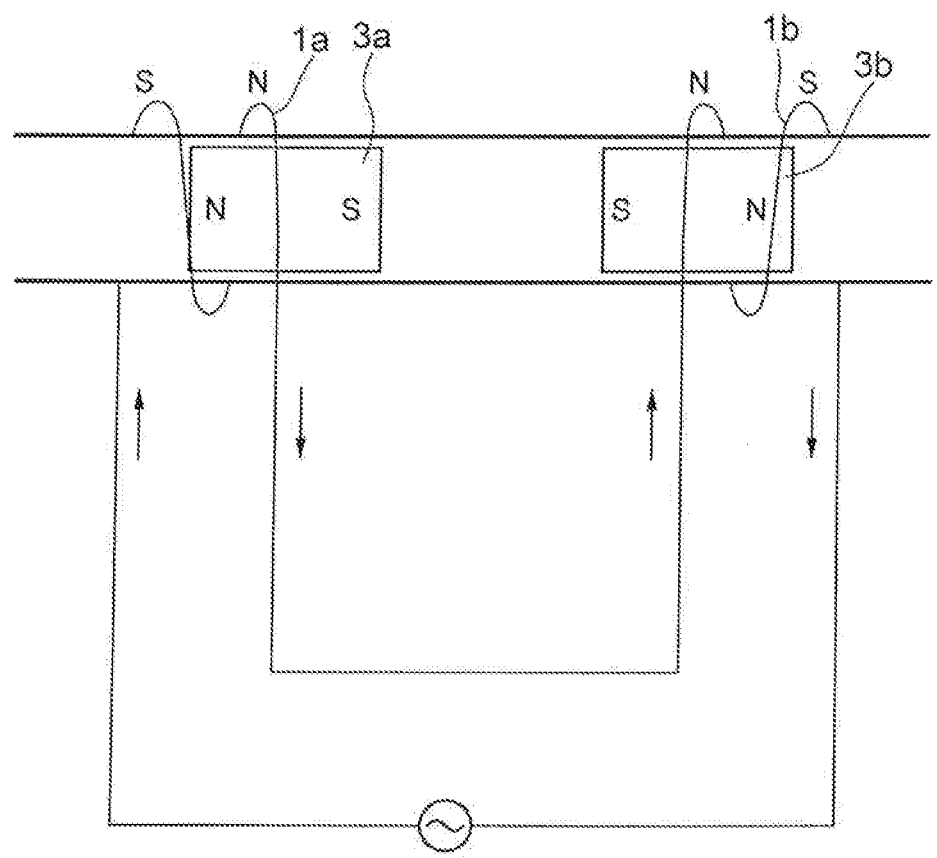
FIG. 12 is a connection diagram of first and second coils (in series).

FIGS. 10 to 12 illustrate connection of the first and second coils 1a and 1b. FIGS. 10 and 11 illustrate the first and second coils 1a and 1b arranged in parallel and FIG. 12 illustrates the coils arranged in series. FIG. 10 illustrates a repelling type in which the same poles of the first and second coils 1a and 1b face each other and FIG. 11 illustrates an attracting type in which the opposite holes of the first and second coils 1a and 1b face each other. Either of the repelling type connection and the attracting type connection may be adopted to oscillate the mover 4.

As illustrated in FIG. 10, a single-phase current indicated by the solid line flows from the AC power source 19 to the first and second coils 1a and 1b. As the single-phase current flows in the first and second coils 1*a* and 1*b*, the mover 4 moves in the axis direction. When the mover 4 moves, the magnetic field lines generated by the first permanent magnet 3*a* cross the first coil 1*a* at a predetermined speed and the magnetic field lines generated by the second permanent magnet 3*b* cross the second coil 1*b* at a predetermined speed. Therefore, back electromotive force is generated in the first and second coils 1*a* and 1*b*. For example, when the mover 4 in the right direction in the figure, there occur, at both ends of the first and second coils 1*a* and 1*b*, magnetic poles that prevent movement of the mover 4 in the right direction. With this electromagnetic induction, back electromotive force indicated by the broken line in the figure is generated at the first and second coils 1*a* and 1*b*.

Figure 13:
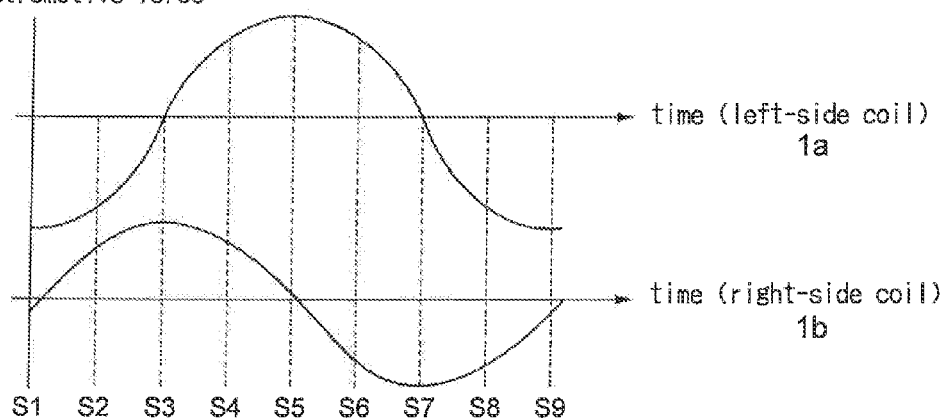
FIG. 13 is a graph illustrating back electromotive force generated in the first and second coils.

FIG. 13 illustrates back electromotive force generated on each coil 1*a*, 1*b* when the mover 4 moves. As described above, the center-to-center pitch of the first and second coils 1*a* and 1*b* and the pole-to-pole pitch of the outer magnetic poles of the first and second permanent magnets 3*a* and 3*b* are shifted from each other by ¼ of the coil length. Therefore, once the mover 4 moves, 90-degree phase-shifted sine-wave back electromotive force is generated on the first and second coils 1*a* and 1*b*. As the back electromotive force generated at whole of the first and second coils 1*a* and 1*b* is combination of the back electromotive force generated at the first coil 1*a* and the back electromotive force generated at the second coil 1*b*, the back electromotive forces generated by the coils cancel out each other by shifting the phases by 90 degrees. The combined back electromotive force is less than twice the back electromotive force generated at each coil (when the phases are shifted by 90 degrees, the combined electromotive force is √2 times). If the back electromotive force is greater, the current flow in the first and second coils 1*a* and 1*b* is reduced so that the mover cannot oscillate at high speeds. The mover 4 can be oscillated at high speeds by reducing the back electromotive force like in this embodiment.

Figure 14:
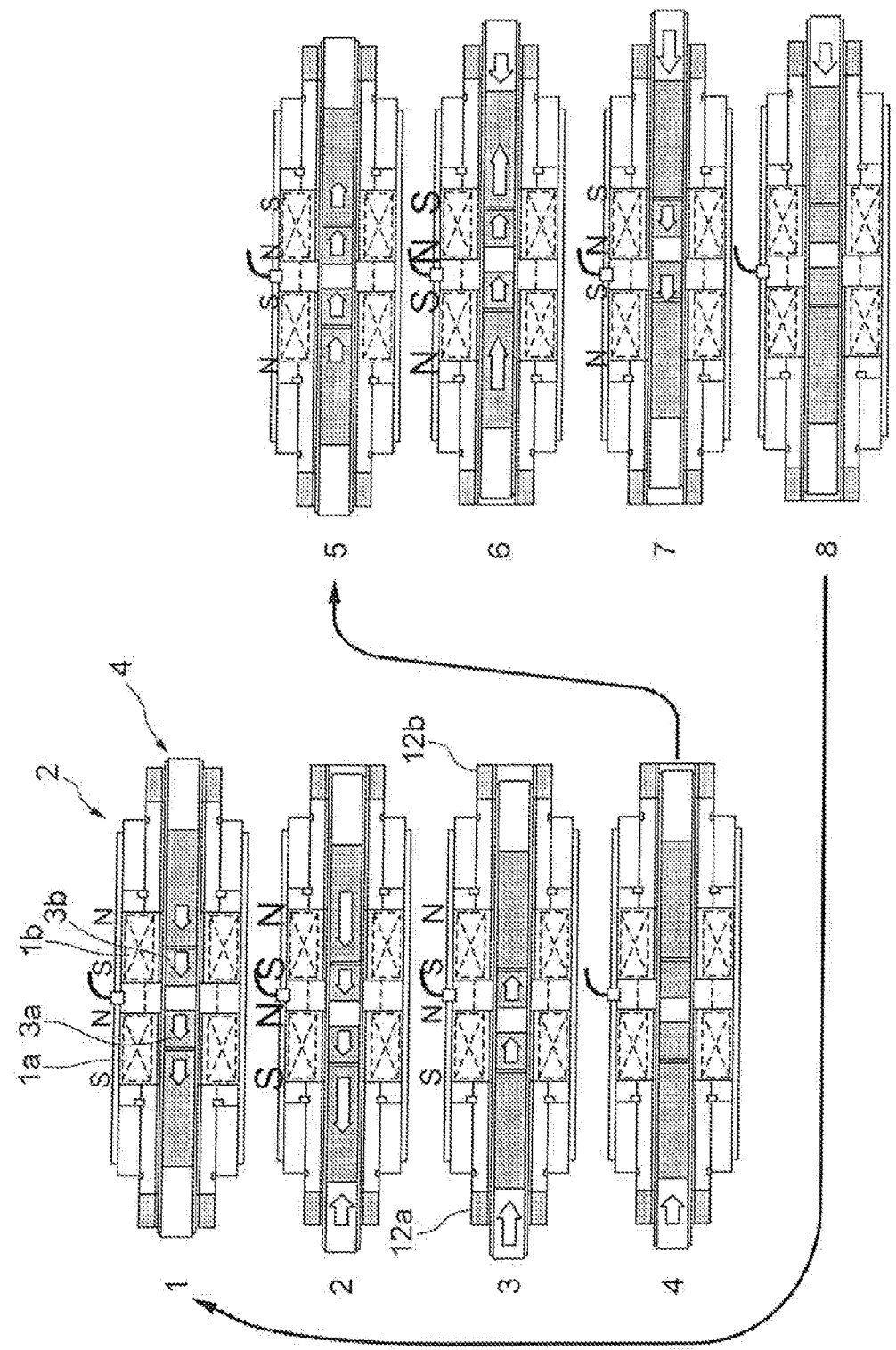
FIG. 14 illustrates a thrust vector of the mover in a moving state.

FIG. 14 illustrates a thrust vector acting on the mover 4 in operation, that is, thrust vector considering a delay angle. When the same-phase alternating currents flow in the first and second coils 1*a* and 1*b*, thrust in the axis direction is generated on the mover 4 by interaction between the current flow in the first coil 1*a* and the magnetic field of the outer magnetic pole of the first permanent magnet 3*a*. Also between the second coil 1*b* and the outer magnetic pole of the second permanent magnet 3*b*, thrust is generated in the axis direction of the mover 4 by interaction between the current flow in the second coil 1*b* and the magnetic field of the outer magnetic pole of the second permanent magnet 3*b*. These are thrust generated in the first and second coils 1*a* and 1*b*. In the case of a motor, the thrust is generated due to a delay angle (=command angle−output angle). That is, when a command sin ωt is input to the first and second coils 1*a* and 1*b*, an output of the mover 4 is delayed by the angle θ to be sine (ωt+θ) and this delay angle is converted into thrust.

As illustrated in FIG. 14, the size of letters NS in the figure represents the magnitude of the magnetic field generated in the coils. When alternating current of a predetermined frequency is made to flow in the first and second coils 1*a* and 1*b*, the mover oscillates at the same frequency. However, it is confirmed by measurement that the phase of the mover is delayed by a phase angle of 30 to 60 degrees as compared with the standstill, also depending on the driving frequency. FIG. 14 illustrates eight positions of the mover (45-degree shifted from each other). The phase of the mover in operation is delayed by one step from the phase of the mover in standstill illustrated in FIG. 15.

As illustrated in FIG. 14, when the mover is located at the original position, the thrust in the left direction is generated from the first and second coils 1*a* and 1*b* to the first and second permanent magnets 3*a* and 3*b* (S1). Therefore, the mover 4 moves in the left direction. While the mover 4 is moving in the left direction, the amount of the first permanent magnet 3*a* in the first coil 1*a* and the amount of the second permanent magnet 3*b* in the second coil 1*b* vary and the magnitude of thrust applied to the mover 4 also varies (S2). When the mover 4 reaches the left end of the stroke, thrust in the right direction is given to the mover 4. The mover 4 is given thrust in the right direction not only from the first and second coils 1*a* and 1*b* but also from the repelling magnet 12*a*. With this thrust, the moving direction of the mover 4 is reversed and the mover 4 starts to move to the right (S3). After the mover 4 starts to move to the right, the current flowing in the first and second coils 1*a* and 1*b* becomes zero instantaneously (S4). Then, the current flow in the first and second coils 1*a* and 1*b* is reversed and thrust in the right direction is given from the first and second coils 1*a* and 1*b* to the first and second permanent magnets 3*a* and 3*b* (S5). The magnitude of the thrust given to the mover 4 in S5 is the same as that of the thrust. Then, the mover 4 moves in the right direction. While the mover 4 is moving in the right direction, the amounts of the first and second permanent magnets 3*a* and 3*b* in the first and second coils 1*a* and 1*b* vary and the thrust applied to the mover 4 also varies (S6). When the mover 4 moves to the right end of the stroke, thrust in the left direction is applied to the mover 4 (S7). The thrust given to the mover 4 from the first and second coils 1*a* and 1*b* after the moving direction of the mover 4 is reversed becomes zero (S8). The mover 4 oscillates at the same frequency as long as alternating current continues to pass through the first and second coils 1*a* and 1*b*.

Figure 15:
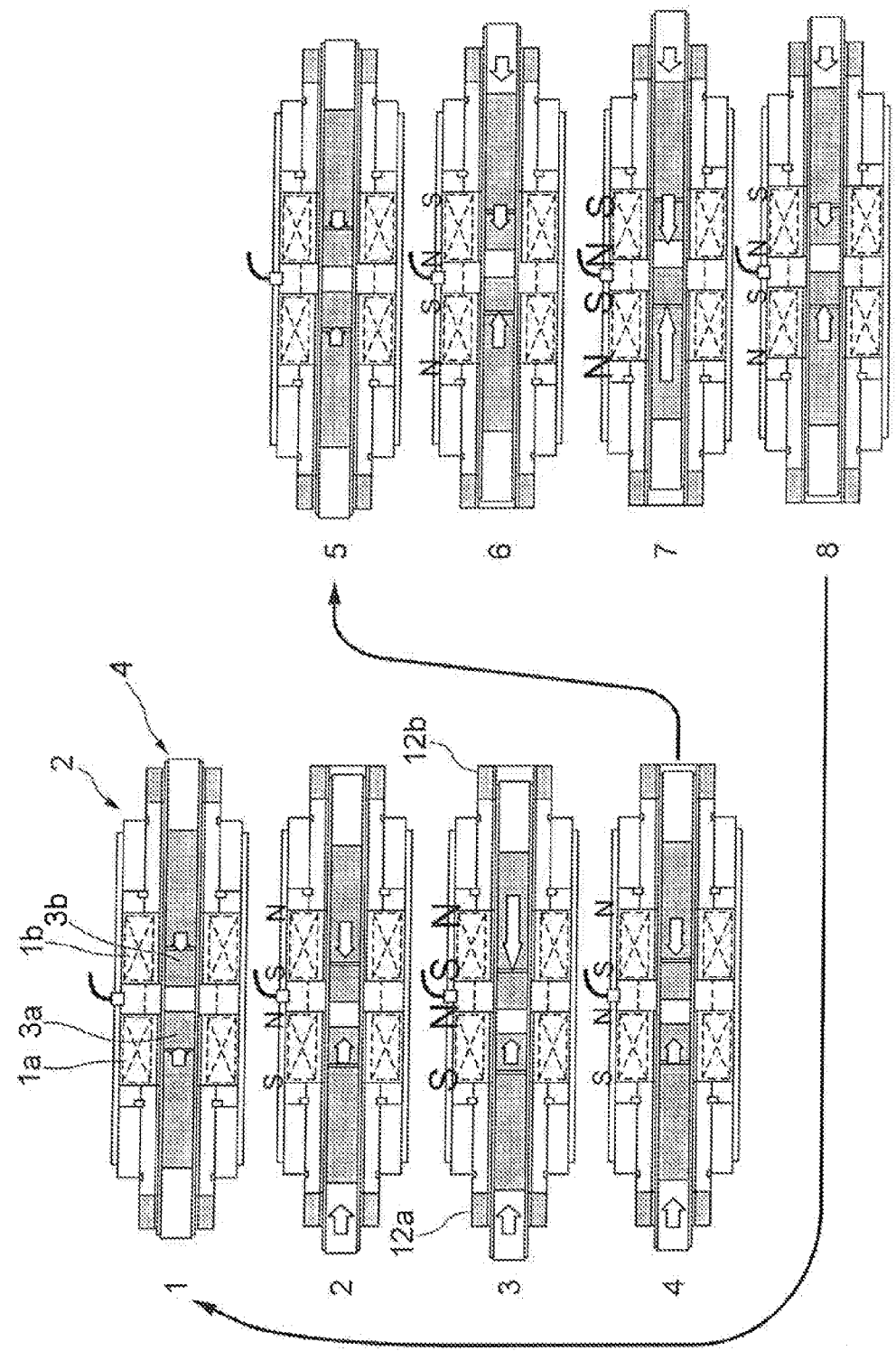
FIG. 15 illustrates a thrust vector of the mover at a standstill.

FIG. 15 illustrates a thrust vector of the mover in the standstill. Assuming that direct current of fixed magnitude is passed through the first and second coils 1*a* and 1*b*, the mover 4 stops when the balance is achieved between the thrust of the first coil 1*a* and the thrust of the second coil 1*b*. Then, when current flow in the first and second coils 1*a* and 1*b* is changed, the mover 4 stops at the point where the balance is achieved between the thrust of the first coil 1*a* and the thrust of the second coil 1*b*. In consideration of this, the linear motor actuator of this embodiment can be used not only as a vibration actuator but also an actuator for controlling the position of the mover 4 that moves in one-axis direction. The position of the mover 4 is controllable by shifting the center-to-center pitch of the first and second coils 1*a* and 1*b* from the pole-to-pole pitch of the magnetic poles of the first and second permanent magnets 3*a* and 3*b* and making two thrust vectors act on the mover 4. Here, the stop position of the mover 4 is also affected by the repelling magnets 12*a* and 12*b*.

Figure 16:
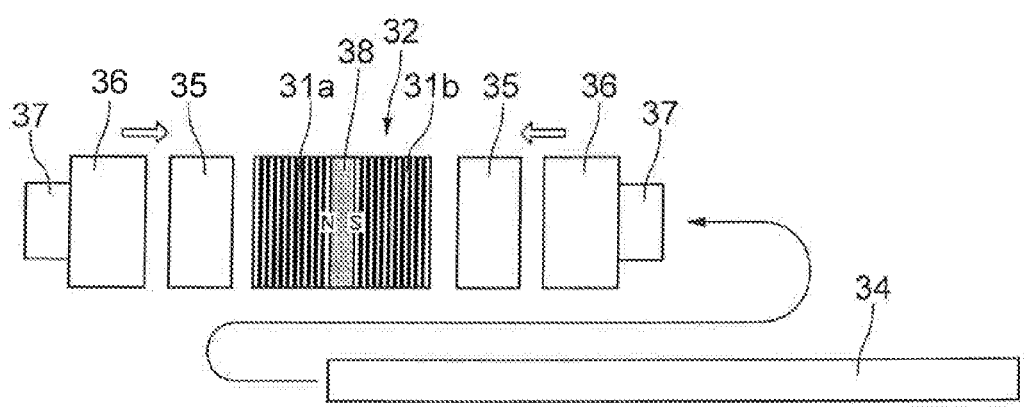
FIG. 16 is a schematic diagram of a linear motor actuator (double coil type) according to a second embodiment of the present invention.
Figure 17:
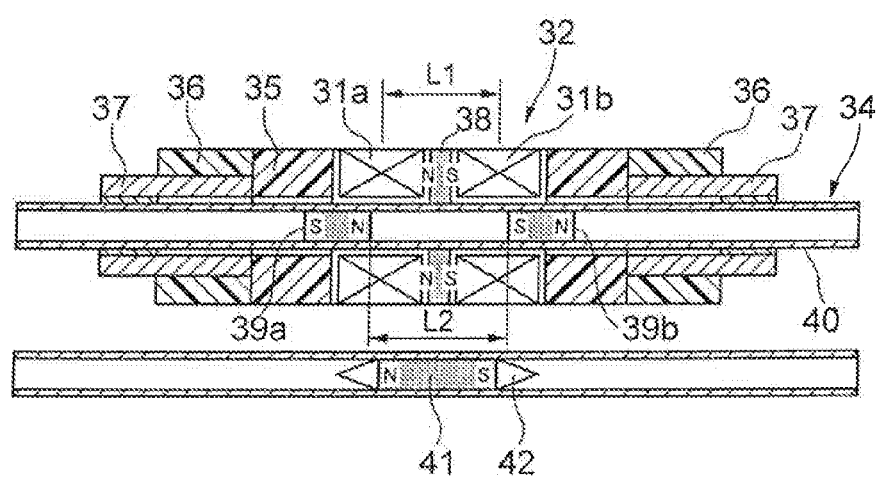
FIG. 17 is a schematic diagram of a linear motor actuator (double coil type) according to a second embodiment of the present invention.

FIGS. 16 and 17 illustrate a double coil type linear motor actuator according to a second embodiment of the present invention. This linear motor actuator is different from the linear motor actuator according to the above-described first embodiment in that a repelling magnet 38 is provided between the first and second coils 31*a* and 31*b* and the pole-to-pole pitch L2 of the first and second permanent magnets 39*a* and 39*b* is made longer than the center-to-center pitch L1 of the first and second coils 31*a* and 31*b* (see FIG. 17). The other structure of the linear motor according to this embodiment is the same as that of the linear motor actuator according to the above-described first embodiment.

In a stator 32, the first and second coils 31*a* and 31*b* are arranged with their axis lines in agreement with each other. Between the first and second coils 31*a* and 31*b*, a ring-shaped repelling magnet 38 is provided for repelling the permanent magnets 39a and 39b of the mover 34 and returning the mover 34 almost to the center of its stroke. Both ends in the axis direction of the repelling magnet 38 are magnetized with N and S poles. This repelling magnet 38 acts as a spacer to create a space between the coils 31a and 31b. Outside the coil unit composed of the first and second coils 31a and 31b, a linear bearing 37 is provided via a spacer 35 and a collar 36. The linear bearing 37 is a bush or spline and guides linear movement of the mover 34.

Figure 18:
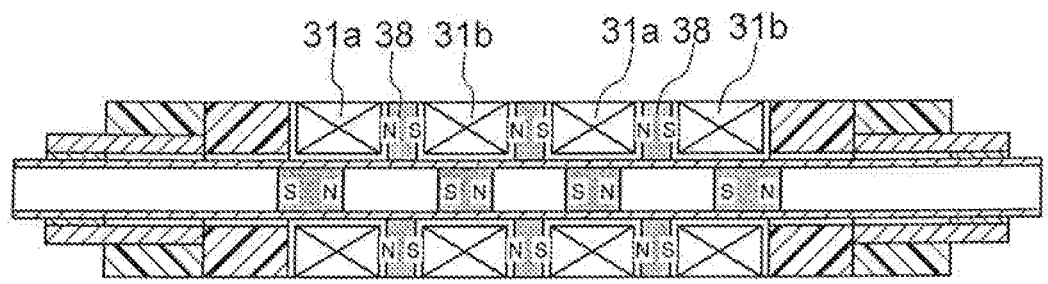
FIG. 18 is a cross sectional view illustrating an example of plural coil units aligned.

As the single repelling magnet 38 is provided between the first and second coils 31a and 31b, it is possible to reduce the number of repelling magnets 38. Besides, as illustrated in FIG. 18, if a plurality of coil units is aligned to increase the thrust, modules each composed of the first coil 31a, repelling magnet 38 and second coil 31b can be aligned advantageously in the axis direction. Further, as no repelling magnet is provided outside the coil unit, there is no fear of attracting the repelling magnet by external iron parts.

As illustrated in FIG. 17, in the mover 34, a first permanent magnet 39a and a second permanent magnet 39b are arranged with a space created in the axis direction therebetween. The first and second permanent magnets 39a and 39b are arranged in such a manner that the different poles face each other, for example, the S pole, N pole, S pole and N pole are created from the left side. Both ends in the axis direction of a permanent magnet unit composed of the first and second permanent magnets 39a and 39b are jutted from both ends in the axis direction of the coil unit composed of the first and second coils 31a and 31b.

As illustrated in the lower part of FIG. 17, in the mover 34, a single center permanent magnet 41 may be arranged. The length in the axis direction of the center permanent magnet 41 are longer than the distance between the inner sides of the first and second coils 31a and 31b and are shorter than the distance between their outsides. At each end of the center permanent magnet 41, a conical magnetic material 42 such as iron may be arranged. With this magnetic material 42, the magnetic field lines at both ends of the center permanent magnet 41 are reduced smoothly so that the stroke of the mover is elongated and movement of the mover 34 is smoothed.

Figure 19:
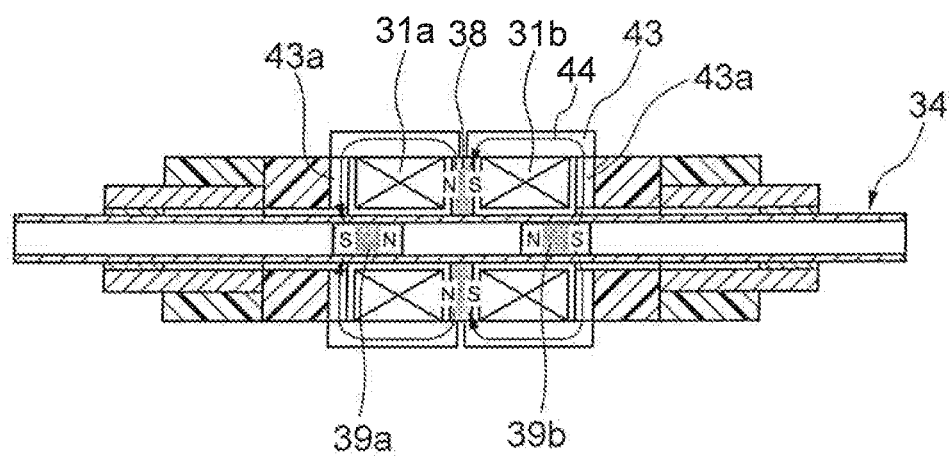
FIG. 19 is a cross sectional view of the first and second coils covered with a tubular yoke.

FIG. 19 illustrates an example in which the first and second coils 31a and 31b are covered with a tubular yoke 43 made of magnetic material such as iron. In the yoke 43, end walls 43a are provided to cover both ends of the coil unit in the axis direction. With this yoke 43, a magnetic circuit 44 is formed that extends from the both ends in the axis direction of the magnetic unit, via through the yoke 43 to the repelling magnet 38, thereby strengthening the attraction force and oscillating the mover 34 vigorously.

Figure 20:
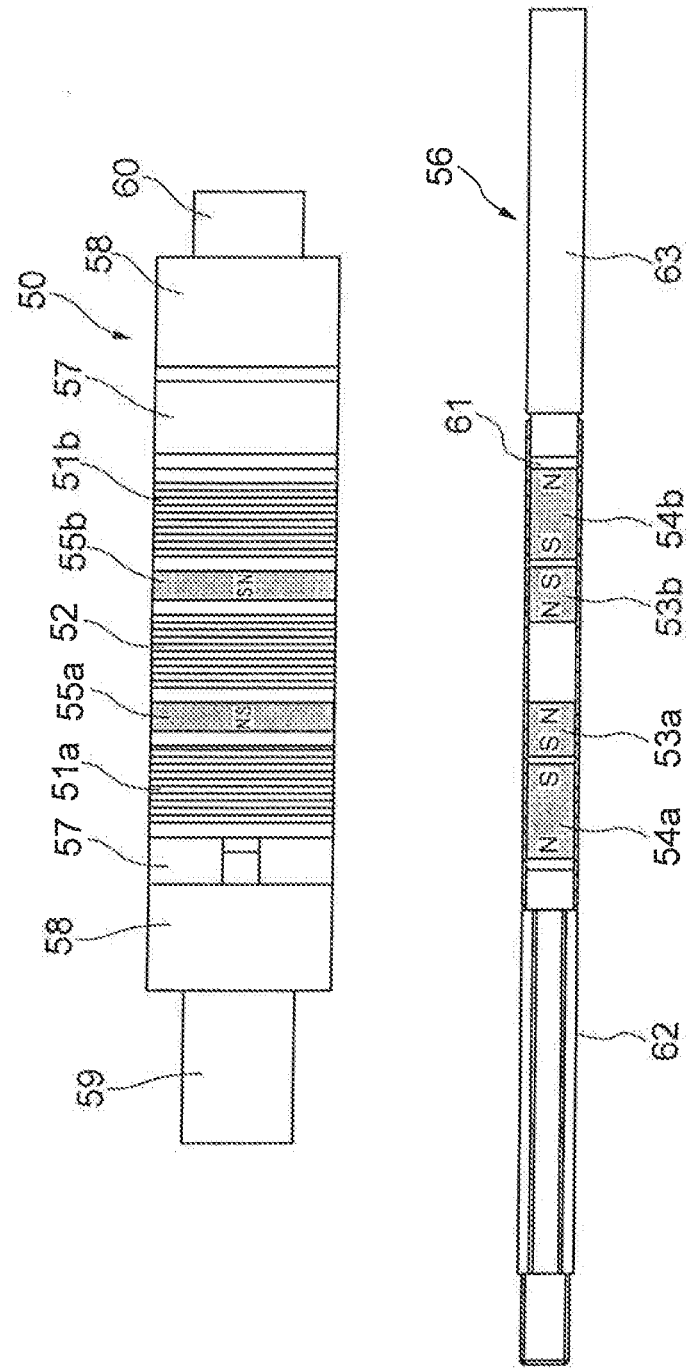
FIG. 20 is a schematic diagram of a linear motor actuator according to a third embodiment of the present invention.

FIG. 20 illustrates a linear motor actuator (triple coil type) according to a third embodiment of the present invention. This linear motor actuator is the same as the linear motor actuator according the first embodiment in that a stator 50 has first and second coils 51a and 51b and a mover 56 has first to fourth permanent magnets 53a, 53b, 54a and 54b. And, the linear motor actuator of this embodiment is different from the linear motor actuator in that a pair of ring magnets 55a and 55b is arranged as repelling magnets between the first and second coils 51a and 51b of the stator 50 and an additional third coil 52 is provided between the first and second coils 51a and 51b of the stator 50.

The paired ring magnets 55a and 55b cover the first and second permanent magnets cover the first and second permanent magnets 53a and 53b, respectively. The lengths of the paired ring magnets 55a and 55b in the axis direction are shorter than the lengths of the first and second permanent magnets 53a and 53b in the axis direction. When the mover 56 is positioned at the center of the stroke, one ring magnet 55a is positioned in the range of the length in the axis direction of the first permanent magnet 53a and the other ring magnet 55b is positioned in the range of the length in the axis direction of the second permanent magnet 53b. Here, the centers of the paired ring magnets 55a and 55b are shifted from the center of the first and second permanent magnets 53a and 53b, respectively, by a predetermined shift length (see FIG. 23).

Outside the first and second coils 51a and 51b of the stator 50, a spline nut 59 and a ball bush 60 are mounted via a spacer 57 and a collar 58. At an end of a rod 61 of the mover 56, a spline shaft 62 is mounted with a spline groove formed. At the other end, a bush shaft 63 having a circular cross section is mounted thereon. The spline shaft 62 and the spline nut 59 have function to stop rotation off the mover 56. In order to prevent contact between the balls, a cage is fit in the spline nut 59 and the ball bush 60.

Figure 21:
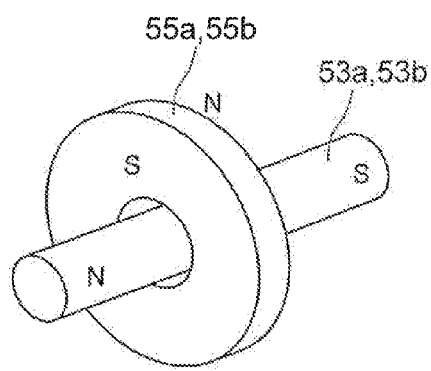
FIG. 21 is a perspective view illustrating positional relationship between a ring magnet and a bar type magnet.

FIG. 21 is a perspective view illustrating positional relationship between the paired ring magnets 55a and 55b and the first and second permanent magnets 53a and 53b. The disc-shaped ring magnets 55a and 55b are magnetized S and N poles in the axis direction. The first and second permanent magnets 53a and 53b are also magnetized with S and N poles in the axis direction. If the N and S poles of the ring magnets 55a and 55b and the N and S poles of the first and second permanent magnets 53a and 53b are reversed, the center in the axis direction between the first and second permanent magnets 53a and 53b is positioned at the center in the axis direction between the ring magnets 55a and 55b.

Figure 22:
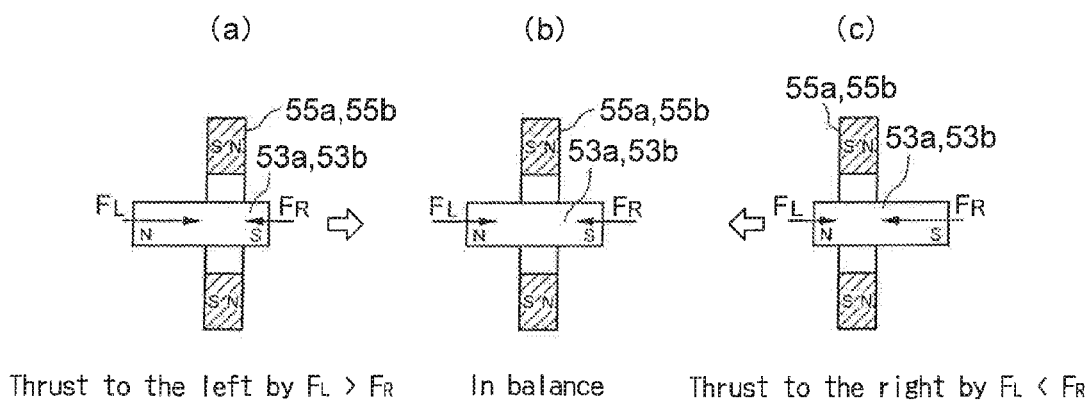
FIGS. 22($a$) to 22($c$) illustrating thrust when a bar shaped magnet moves (FIG. 22($a$) illustrates the bar shaped magnet moving to the left, FIG. 22($b$) illustrates the bar shaped magnet located at the center and FIG. 22($c$) illustrates the bar shaped magnet moving to the right.

As illustrated in FIG. 22(a), when the first and second permanent magnets 53a and 53b move from the centers of the ring magnets 55a and 55b to the left, resilience in the right direction is generated in the first and second permanent magnets 53a and 53b. As illustrated in FIG. 22(b), if the centers of the first and second permanent magnets 53a and 53b agree with the centers f the ring magnets 55a and 55b, they are balanced and the first and second permanent magnets 53a and 53b are maintained at their positions. As illustrated in FIG. 22(c), when the first and second permanent magnets 53a and 53b moves right from the centers of the ring magnets 55a and 55b, resilience in the left direction is generated in the first and second permanent magnets 53a and 53b. As both magnetic poles of the ring magnets 55a and 55b are used for resilience, it is possible to enhance the volumetric efficiency (resilience/volume)

Figure 23:
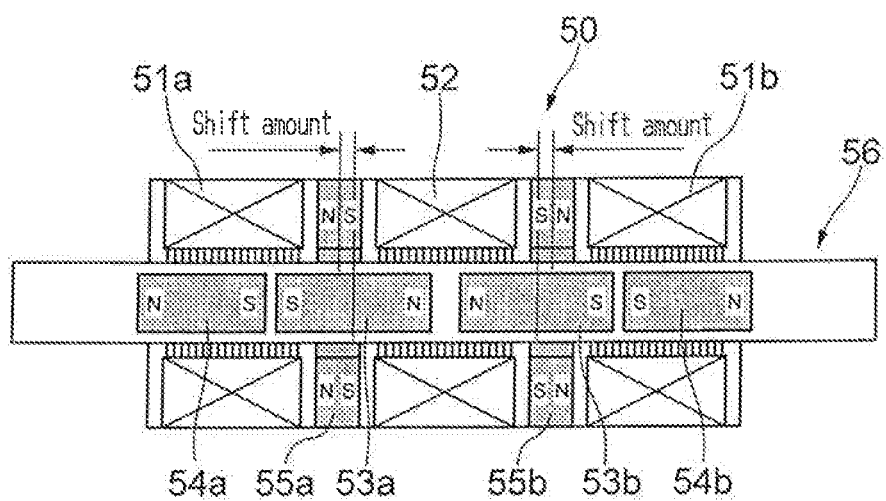
FIG. 23 is a schematic diagram illustrating the first and second permanent magnets that are shifted from a pair of ring magnets.
Figure 24:
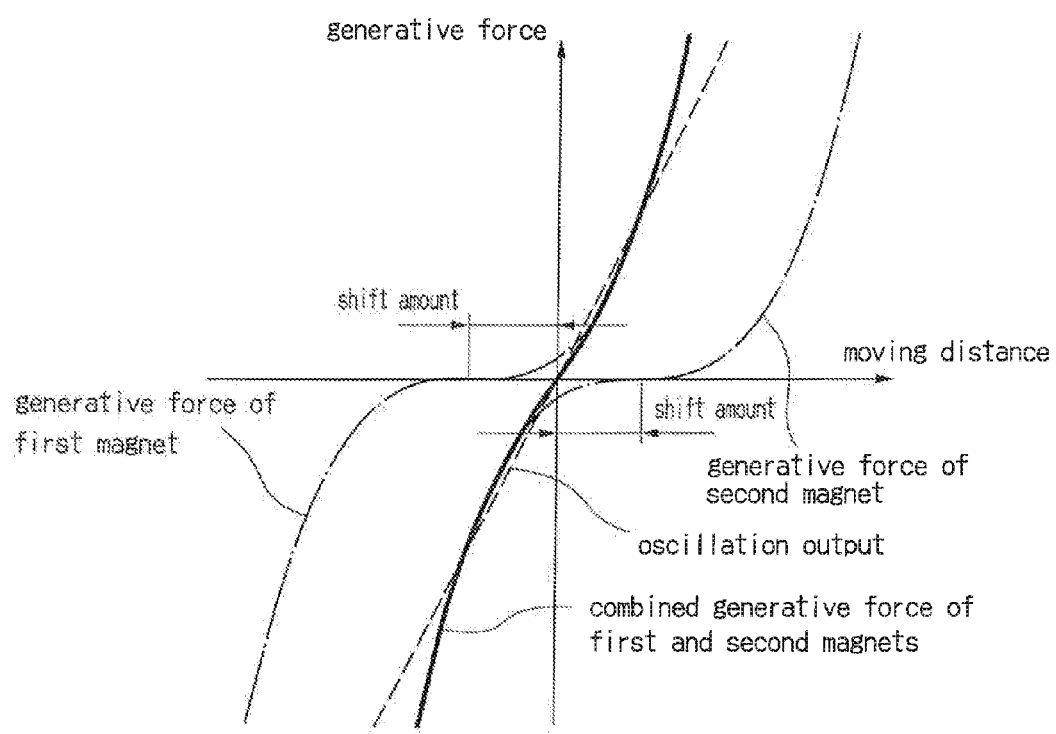
FIG. 24 is a graph illustrating relationship between the position of the mover and the resilience (generative force) generated in the mover.

As illustrated in FIG. 23, if the centers of the paired ring magnets 55a and 55b are shifted from the respective centers of the first and second permanent magnets 53a and 53b, the mover 56 is preloaded at the center of the stroke. FIG. 24 illustrates relationship between the position of the mover 56 and resilience (generative force) generated in the mover 56. The resilience on the mover 56 is combination of resilience on the first permanent magnet 53a and resilience on the second permanent magnet 53b. As they are combined, combined resilience can be proportional to displacement even near the original point, which facilitates returning of the mover 56 to the original point 56. Besides, as illustrated in FIG. 23, the paired ring magnets 55a and 55b are arranged inside the first and second coils 51a and 51b of the stator 50, magnetic force is leaked from the paired ring magnets 55a and 55b to the outside thereby to reduce the risk of absorbing foreign materials.

Next description is made about the third coil 52 positioned between the first and second coils 51a and 51b. As illustrated in FIG. 20, the third coil 52 is arranged between the first and second coils 51a and 51b and between the paired ring magnets 55a and 55b. The paired ring magnets 55a and 55b are arranged in the stator 50 in such a manner that the same poles face each other.

Figure 25:
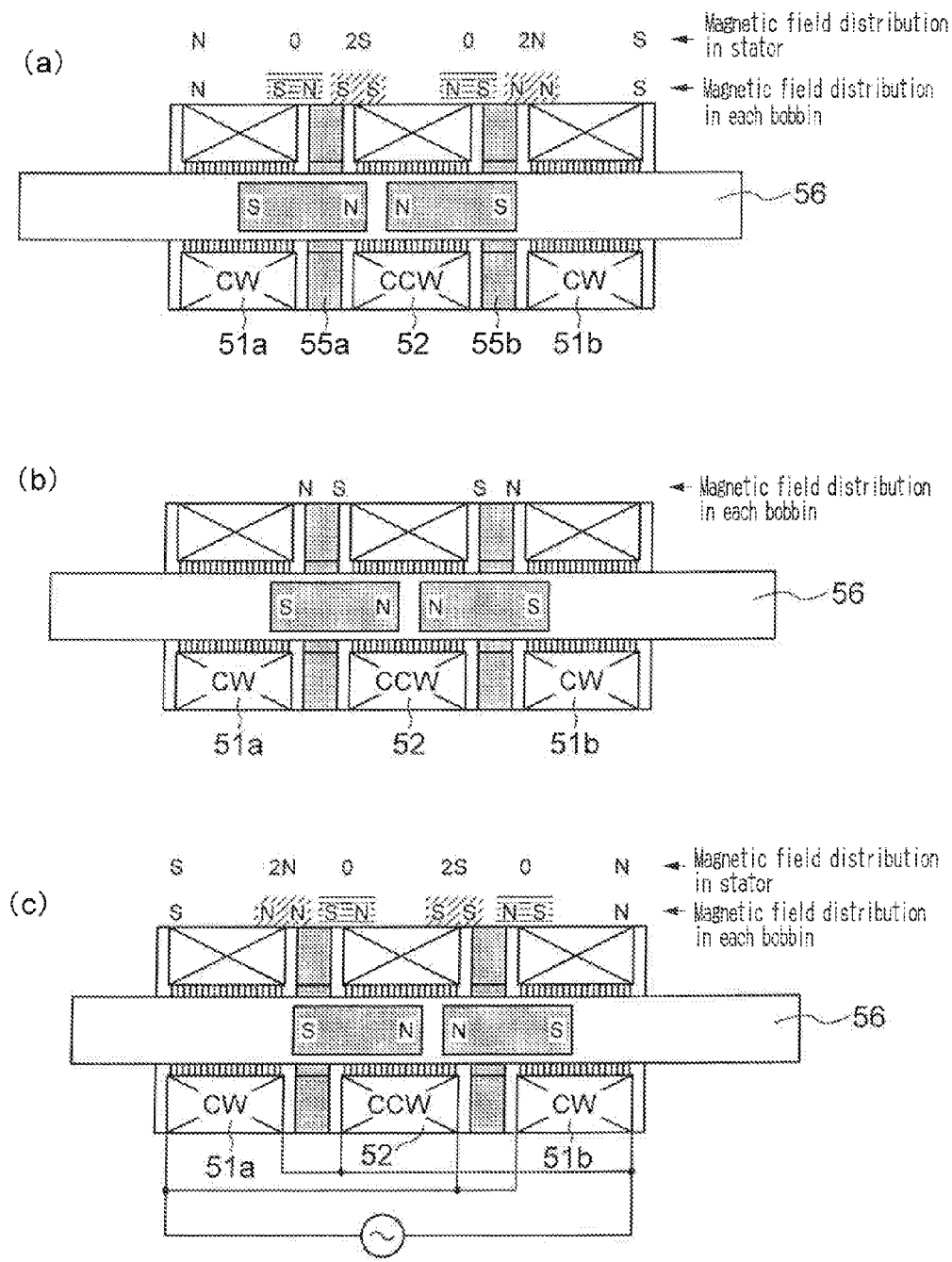
FIGS. 25($a$) to 25($c$) illustrate change of magnetic poles formed at both ends of the third coil.

FIGS. 25(a) to 25(c) illustrate change in magnetic poles formed at both ends of the third coil 52. As illustrated in this figure, alternating current of the same phase as that of the first and second coils 51a and 51b flows in the third coil 62. The winding direction of the third coil 52 is reverse to the winding direction of the first and second coils 51a and 51b and the opposite magnetic poles to those of the first and second coils 51a and 51b are formed at both ends of the third coil 52 in the axis direction. The opposite magnetic poles can be also formed in the third coil 52 when the winding direction of the third coil 52 is the same as that of the first and second coils 51a and 51b and current is passed in the opposite direction. When the alternating current of the same phase is passed through the first to third coils 51a, 51b and 52, the N and S poles indicated by magnetic field distribution in each bobbin in the figure are created at both ends of each coil in the axis direction. Seeing the stator as a whole, the magnetic fields indicated by horizontal hatching cancel out each other and the magnetic fields indicated by oblique hatching strengthen each other. Therefore, assuming that the outputs of the coils 51a, 51b and 52 are the same as the outputs of the ring magnets 55a and 55b, the strength of the magnetic field of the stator 50 as a whole is as shown in the magnetic field distribution in the stator in the figure. With this magnetic field distribution in the stator, when the mover 56 moves to the left end, resilience for moving to the right acts on the mover 56 as illustrated in FIG. 25(a). And, when the mover 56 moves to the right, resilience for moving to the left acts on the mover 56 as illustrated in FIG. 25(c). As the third coil 52 is provided between the first and second coils 51a and 51b, it becomes possible to oscillate the mover 56 with larger amplitude and more vigorously.

Figure 26:
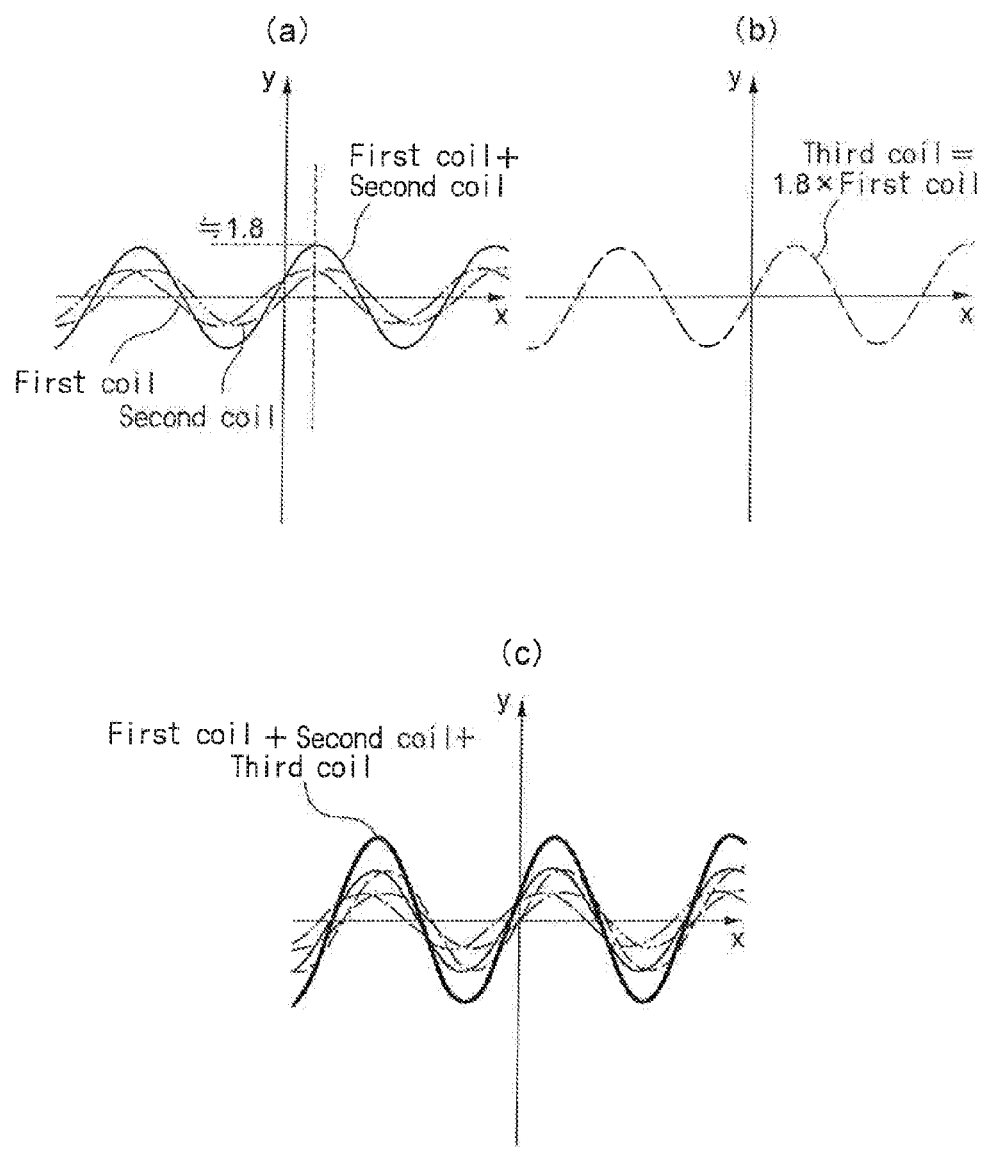
FIGS. 26($a$) to 26($c$) are graphs illustrating outputs of the first to third coils (FIG. 26($a$) illustrates a combined output of the first and second coils, FIG. 26($b$) illustrates an output of the third coil FIG. 26($c$) illustrates a combined output of the first to third coils.

FIGS. 26(a) to 26(c) illustrate outputs of the first to third coils. FIG. 26(a) illustrates outputs of the first and second coils 51a and 51b. In this example, the phases of the outputs of the first and second coils 51a and 51b are shifted from each other by $\pi/4$. Accordingly, a value obtained by combining outputs of the first and second coils 51a and 51b is 1.8 times larger than the single output of the first coil 51a. FIG. 26(b) illustrates an output of the third coil 52. If the output of the third coil 52 is 1.8 times larger than the output of the first coil 51a, the combined output of the first and second coils 51a and 51b can conform in size to the output of the third coil 52. As the output sizes conform to each other, as illustrated in FIG. 26(c), the combined output of the first to third coils can be close to accurate sine wave. Accordingly, the time-displacement curve of the mover 56 can be also close to the accurate sine wave. Here, if a stereo amplifier is used, the output of the third coil 52 is phase shifted from the outputs of the first and second coils 15a and 51b and these outputs have same peak, the outputs can be more effective.

Here, in order to increase the output of the third coil 52 to 1.8 times the output of the first coil 51a, ampere turns of the third coil 52 may be increased to 1.8 times the ampere turns of the first coils 51a. That is, the following equation needs to be satisfied: the current flow in the third coil 52×the number of turns=the current flow in the first coil 51a×the number of turns×1.8.

For example, when 10 V voltage is applied to the coil, the following equations are satisfied:

The third coil=1500[T]×111[mA]=166.5[AT]

The first coil=the second coil=2400[T]×45[mA]=108.0[AT]

Considering an output ratio (ampere-turn ratio), 166.5/108.0=1.54 (this is nearly equal to 1.8)

A difference between 1.54 and 1.8 is given as inductance of the first and second coils 51a and 51b are not considered in calculation. Actual outputs of the first and second coils 51a and 51b are lower than 108.0 [AT]. When reverse connection was made in the third coil 52, the mover 56 did not work at the above-mentioned output ratio. Therefore, it can be confirmed that the output of the third coil 52 is approximately equal to combination of outputs of the first and second coils 51a and 51b.

On the principle of oscillating the mover 56, it is necessary to shift the center-to-center pitch of the first and second coils 51a and 51b from the pole-to-pole pitch. In view of this, a space is easily created between the first and second coils 51a and 51b. As the third coil 52 is placed between the first and second coils 51a and 51b, it becomes possible to reduce the unnecessary space and to enhance volumetric efficiency (output/volume). Further, if the output of the third coil 52 is greater than the outputs of the first and second coils 51a and 51b, it is possible to make the above-mentioned combined outputs of the first to third coils 51a, 51b and 52 close to sine wave.

Figure 27:
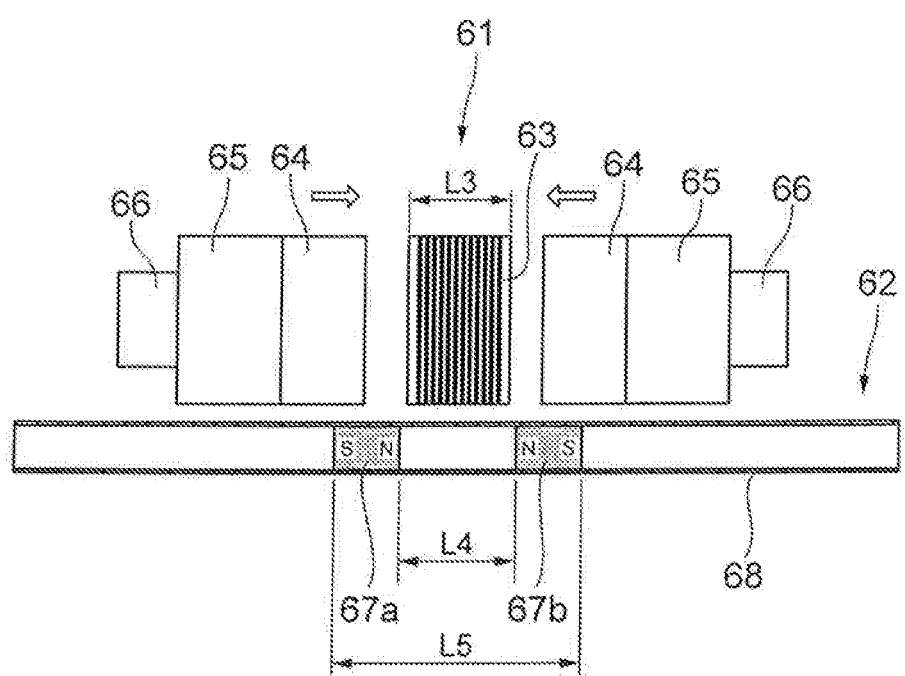
FIG. 27 is a fundamental structural view of a linear motor actuator having a stator with one coil (single coil type actuator).

FIG. 27 illustrates a fundamental structure of the single coil type linear motor actuator having only one coil 63 in a stator 61. The mover 4 passes through a space in the coil 63. The axis line of the coil 63 is in agreement with oscillation of the mover 62. At both ends in the axis direction of the coil 63, a linear bearing 66 is provided via a spacer 64 and a collar 65. The linear bearing 66 is a bush or spline and guides linear movement of the mover 62. The coil 63, spacer 64, collar 65 and linear bearing 66 are accommodated in a tubular yoke of the stator 61.

The mover 62 has a pipe type rod 68 and first and second permanent magnets 67a and 67b arranged with a space created therebetween in the rod 68. The ratio of the number of coils 63 and the number of the permanent magnets 67a, 67b is 1:2. Both ends of each of the first and second permanent magnets 67a and 67b in the axis directions are magnetized with N and S poles and these permanent magnets are arranged in such a manner that the same poles face each other (the N pole faces the N pole and the S pole faces the S pole). The distance L4 inside the first and second permanent magnets 67a and 67b is longer than the length L3 of the coil 63 in the axis direction. Therefore, the first and second permanent magnets 67a and 67b are arranged axially outside the coil 63. Here, the length L5 between axially both ends of a permanent magnet unit composed of the first and second permanent magnets 67a and 67b has only to be longer than the length of the coil 63 in the axis direction, and the inside of the first and second permanent magnets 67a and 67b may fall between both ends of the coil 63 in the axis direction. The length of each of the permanent coils 67a and 67b in the axis direction is shorter than the length of the coil 63 in the axis direction. The positional relationship between the coil 63 and the first and second permanent magnets 67a, 67b is such that when the mover 62 moves up to an end in the axis direction, one of the first and second permanent magnets 67a and 67b moves inside the coil 63, and when the mover 62 moves up to the other end in the axis direction, the other of the first and second permanent magnets 67a and 67b moves inside the coil 63.

When single-phase current flows in the coil 63, the magnetic poles are formed at both ends of the coil 63 in order of SN, sn, NS, ns and SN. For example, when the S pole is formed at the left end and the N pole is formed at the right end of the coil 63, the coil 63 and the first permanent magnet 67a attract each other and the coil 63 and the second permanent magnet 67b repel each other. Therefore, the mover 62 moves in the right direction in the figure. As the mover 62 moves to the right in the fire, the first permanent magnet 67a enters the coil 63. When the first permanent magnet 67a is in the coil 63, the current flow in the coil 63 is reversed. Then, the first permanent magnet 67a and the coil 63 repel each other vigorously. Therefore, the moving direction of the mover 62 is reversed and it moves to the left in the figure. When the mover 62 goes beyond the center of the stroke, the coil 63 and the second permanent magnet 67b attract each other and the second permanent magnet 67b enters the coil 63. If the current flow in the coil 63 is reversed in this state, the second permanent magnet 67b and the coil 63 repel each other vigorously and the moving direction of the mover 62 is reversed again. Repeating this, the mover 62 oscillates.

At both ends in the axis direction of the coil 63, a pair of ring magnets may be arranged that cover the first and second permanent magnets 67a and 67b and returns the mover 62 to the center of the stroke when no current flows in the coil 63. Arrangement of the paired ring magnets and magnetic poles may be the same as those of the paired ring magnets 55a and 55b arranged at both ends of the third coil 52 of FIGS. 23 and 25. As the paired ring magnets are arranged, it becomes possible to return the mover to the original point and also to oscillate the mover 62 vigorously.

The present invention is not limited to the above-described embodiments and may be embodied in various forms without departing from the scope of the present invention.

In order to shift the phase of thrust generated in the first coil of the stator from that of the second coil, alternating currents of different phase may be made to flow in the first and second coils of the stator and a center-to-center pitch connecting the center in the axis direction of the first coil to the center in the axis direction of the second coil may conform to the pole-to-pole pitch of the mover. The mover may have one or more permanent magnets and first to fourth permanent magnets may be provided like in the above-mentioned first embodiment.

Besides, in order to shift the phase of thrust generated in the first coil of the stator from that of the second coil, phase-shifted currents may be passed through the first and second coils of the stator and the center-to-center pitch that connects the centers in the axis direction of the first and second coils to each other may be differentiated from the pole-to-pole pitch of the mover. The mover may have one or more permanent magnets and the first to fourth permanent magnets may be provided like in the above-described first embodiment.

Arrangement of the mover is not limited to arrangement in the horizontal direction and may be arrangement in the vertical direction. If gravity acts on the mover, the mover can travel as far as a force acts from the first and second coils to the first and second permanent magnets.

When the inertia of the mover is small, the mover can travel if two outside permanent magnets or repelling magnets are omitted. When the inertia of the mover is large, a spring may be added between the stator and the mover.

In oscillating the mover, the current flows into the first and second coils may only be alternating current that flows alternately in opposite directions at predetermined periods. Not only the sine-wave voltage but also saw wave voltage, triangle wave voltage or square wave voltage may be applied to the first and second coils.

Further, the first and second coils may be provided in the mover and the first and second permanent magnets may be provided in the stator so that the coil side can travel.

The present specification is based on Japanese Patent Applications No. 2009-098601 filed on Apr. 15, 2009 and No. 2009-293915 filed on Dec. 25, 2009, the entire contents of which are expressly incorporated by reference herein.

INDUSTRIAL APPLICABILITY

The linear motor actuator of this invention possesses high rigidity and is drivable even in a high speed range. Therefore, it is applicable in various technical fields such as actuators for customer devices, measuring units, artisanal machines, automobiles, medical machines, robots and industrial machines. Particularly, it can be used suitably for driving camera focusing, hand tools, pumps, die bonders, check pins for board testers and the like. When it is large sized, it can be used as a damper.

The linear motor of this invention can be suitably used as an oscillatory actuator having a larger amplitude in the range of 0 to 200 Hz. If an encoder is used to control a current flow into the first and second coils, it is possible to control the position of the mover.

REFERENCE NUMERALS 1a, 31a, 51a . . . first coil
1b, 31b, 51b . . . second coil
52 . . . third coil
2, 32, 50, 61 . . . stator
3a, 53a, 67a . . . first permanent magnet
3b, 53b, 67b . . . second permanent magnet
3c, 41 . . . center permanent magnet
4, 34, 56, 62 . . . mover
12a, 12b . . . a pair of repelling magnets (returning permanent magnets)
13a . . . third permanent magnet
13b . . . fourth permanent magnet
38 . . . ring magnet (returning permanent magnets)
55a, 55b . . . a pair of ring magnets (returning permanent magnets)
61 . . . coil

The invention claimed is:

1. A linear motor actuator comprising: one of a mover and a stator having at least one permanent magnet magnetized with N and S poles in an axis direction; and an other of the mover and the stator having a first coil and a second coil that surround the one of the mover and the stator and are arranged in the axis direction, wherein alternating currents having same phases are passed through the first coil and the second coil and a center-to-center pitch that connects a center of the first coil to a center of the second coil in the axis direction is differentiated from a pole-to-pole pitch of magnetic poles of the one of the mover and the stator in such a manner that phase of thrust generated in the first coil and phase of thrust generated in the second coil are shifted from each other.

2. The linear motor actuator of claim 1, wherein
the one of the mover and the stator has, as the at least one permanent magnet, a first permanent magnet and a second permanent magnet that are arranged in the axis direction in such a manner that same magnetic poles face each other, and
the pole-to-pole pitch of outer magnetic poles of the first permanent magnet and the second permanent magnet or the pole-to-pole pitch of inner magnetic poles of the first permanent magnet and the second permanent magnet is differentiated from the center-to-center pitch of the first coil and the second coil.

3. The linear motor actuator of claim 2, wherein
the pole-to-pole pitch of the outer magnetic poles of the first permanent magnet and the second permanent magnet is differentiated from the center-to-center pitch of the first coil and the second coil, and outside the first permanent magnet and the second permanent magnet, a third permanent magnet and a fourth permanent magnet magnetized with N and S poles in the axis direction are arranged so as to strengthen the outer magnetic poles of the first permanent magnet and the second permanent magnet.

4. The linear motor actuator of claim 2 or 3, wherein the other of the mover and the stator is provided with a returning permanent magnet for returning the mover to a center of stroke when no current is passed through the first coil and the second coil.

5. The linear motor actuator of claim 4, wherein the returning permanent magnet has a pair of ring magnets that are arranged between the first coil and the second coil and surround the first permanent magnet and the second permanent magnet, and each of the ring magnets is magnetized with N and S poles in the axis direction.

6. The linear motor actuator of claim 5, wherein in the other of the mover and the stator, the ring magnets are arranged in such a manner that same poles face each other, and a third coil is arranged between the ring magnets.

7. The linear motor actuator of claim 2, wherein in the one of the mover and the stator, a center permanent magnet is arranged between the first permanent magnet and the second permanent magnet, the pole-to-pole pitch between magnetic poles of the center permanent magnet in the axis direction is shorter than inner dimensions of the first coil and the second coil, and when the mover moves up to an end in the axis direction, one magnetic pole of the center permanent magnet gets into one of the first coil and the second coil and when the mover moves up to an opposite end in the axis direction, an other magnetic pole of the center permanent magnet gets into an other of the first coil and the second coil.

8. The linear motor actuator of claim 1, wherein the one of the mover and the stator has, as the at least one permanent magnet, a center permanent magnet that is magnetized with N and S poles in the axis direction and is arranged between the first coil and the second coil, and the pole-to-pole pitch between magnetic poles of the center permanent magnet in the axis direction is shorter than inner dimensions of the first coil and the second coil.

9. A linear motor actuator comprising:

one of a mover and a stator having at least one permanent magnet magnetized with N and S poles in an axis direction; and an other of the mover and the stator having a first coil and a second coil that surround the one of the mover and the stator and are arranged in the axis direction, wherein alternating currents having different phases are passed through the first coil and the second coil and a center-to-center pitch that connects a center of the first coil to a center of the second coil in the axis direction is conformed to a pole-to-pole pitch of magnetic poles of the one of the mover and the stator in such a manner that phase of thrust generated in the first coil and phase of thrust generated in the second coil are shifted from each other, at least one returning permanent magnet is arranged between the first coil and the second coil, and the returning permanent magnet returns the mover to a center of stroke when no current is passed through the first coil and second coil.

10. A linear motor actuator comprising: one of a mover and a stator having at least one permanent magnet magnetized with N and S poles in an axis direction; and an other of the mover and the stator having a first coil and a second coil that surround the one of the mover and the stator and are arranged in the axis direction, wherein alternating currents having different phases are passed through the first coil and the second coil and a center-to-center pitch that connects a center of the first coil to a center of the second coil in the axis direction is differentiated from a pole-to-pole pitch of magnetic poles of the one of the mover and the stator in such a manner that phase of thrust generated in the first coil and phase of thrust generated in the second coil are shifted from each other.

11. A linear motor actuator comprising:

one of a mover and a stator having a first permanent magnet and a second permanent magnet that are magnetized with N and S poles in an axis direction and are arranged with a space created therebetween in such a manner that same poles face each other; and an other of the mover and the stator having a single coil that surrounds the one of the mover and the stator, wherein an N pole-to-N pole pitch or an S pole-to-S pole pitch of outer magnetic poles of the first permanent magnet and the second permanent magnet is longer than a length of the single coil in the axis direction, a distance inside the first permanent magnet and the second permanent magnet is longer than a length of the single coil in the axis direction, when an alternating current is passed through the single coil, the mover moves relative to the stator, and when the mover moves up to an end of stroke, the first permanent magnet gets in the single coil and when the mover moves to an opposite end of the stroke, the second permanent magnet gets into the single coil.

12. The linear motor actuator of claim 1 or 10, wherein at least one returning permanent magnet is arranged between the first coil and the second coil, and the returning permanent magnet returns the mover to a center of stroke when no current is passed through the first coil and second coil.

* * * * *